United States Patent
Stockhammer et al.

(10) Patent No.: US 10,454,985 B2
(45) Date of Patent: Oct. 22, 2019

(54) FILE FORMAT BASED STREAMING WITH DASH FORMATS BASED ON LCT

(71) Applicant: QUALCOMM Incorporated, San Diego, CA (US)

(72) Inventors: Thomas Stockhammer, Bergen (DE); Gordon Kent Walker, Poway, CA (US); Ye-Kui Wang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 717 days.

(21) Appl. No.: 15/058,963

(22) Filed: Mar. 2, 2016

(65) Prior Publication Data

US 2016/0261665 A1 Sep. 8, 2016

Related U.S. Application Data

(60) Provisional application No. 62/128,380, filed on Mar. 4, 2015, provisional application No. 62/128,943, filed on Mar. 5, 2015.

(51) Int. Cl.
*H04L 29/06* (2006.01)
*H04L 29/08* (2006.01)
(Continued)

(52) U.S. Cl.
CPC ........ *H04L 65/604* (2013.01); *H04L 65/4069* (2013.01); *H04L 65/4084* (2013.01);
(Continued)

(58) Field of Classification Search
CPC .. H04N 21/2362; H04L 65/4076; H04W 4/06
See application file for complete search history.

(56) References Cited

U.S. PATENT DOCUMENTS

| | | |
|---|---|---|
| 2012/0259994 A1 | 10/2012 | Gillies et al. |
| 2013/0097334 A1* | 4/2013 | Wu ........ H04L 65/608 709/231 |

(Continued)

FOREIGN PATENT DOCUMENTS

| | | |
|---|---|---|
| WO | 2014063730 A1 | 5/2014 |
| WO | 2016018042 A1 | 2/2016 |
| WO | 2016112157 A1 | 7/2016 |

OTHER PUBLICATIONS

International Preliminary Report on Patentability of International Application No. PCT/US2016/020652, dated Apr. 11, 2017, 7 pp.

(Continued)

*Primary Examiner* — Esther B. Henderson
*Assistant Examiner* — Dae Kim
(74) *Attorney, Agent, or Firm* — Shumaker & Sieffert, P.A.

(57) ABSTRACT

In one example, a device includes one or more media decoders configured to decode media data, a network interface configured to receive a layered coding transport (LCT) Session Instance Description (LSID), the LSID including information representing a plurality of LCT sessions, each of the LCT sessions including data of a respective one of a plurality of representations of a DASH media presentation and data of one or more of the LCT sessions, and a processor configured to initiate consumption of one or more of the representations of the DASH media presentation using the LSID and without using a manifest file for the DASH media presentation, wherein to initiate consumption, the processor is configured to receive, via the network interface, packets of the LCT sessions including portions of data of the one or more of the representations; and provide data of the packets to the one or more media decoders.

30 Claims, 17 Drawing Sheets

(51) Int. Cl.
*H04N 21/2343* (2011.01)
*H04N 21/262* (2011.01)
*H04N 21/61* (2011.01)
*H04N 21/845* (2011.01)

(52) U.S. Cl.
CPC ............ *H04L 65/608* (2013.01); *H04L 67/02* (2013.01); *H04N 21/23439* (2013.01); *H04N 21/26258* (2013.01); *H04N 21/6131* (2013.01); *H04N 21/8456* (2013.01)

(56) References Cited

U.S. PATENT DOCUMENTS

| | | | | |
|---|---|---|---|---|
| 2013/0297743 | A1* | 11/2013 | Eschet | H04L 65/60 709/219 |
| 2016/0204887 | A1* | 7/2016 | Lee | H04H 20/71 375/295 |
| 2016/0234536 | A1 | 8/2016 | Stockhammer et al. | |
| 2017/0019688 | A1* | 1/2017 | Lee | H04N 21/238 |

OTHER PUBLICATIONS

International Search Report and Written Opinion of International Application No. PCT/US2016/020652, dated May 25, 2016, 15 pp.
Luby et al., "Layered Coding Transport (LCT) Building Block", Network Working Group, IETF, RFC 5651, Oct. 2009, 42 pp.
Samsung Electronics Co. et al., "Object Flow Mapping and Consumption," 3GPP Draft; S4-140809, 3rd Generation Partnership Project (3GPP), Mobile Competence Centre; 650, Route Des Lucioles; F-06921 Sophia-Antipolis Cedex; France vol. SA WG4, No. San Francisco, US Aug. 1, 2014, XP050805931, URL: http://www.3gpp.org/ftp/Meetings_3GPP_SYNC/SA4/Docs/, 5 pp.
Stockhammer, "Input to MPEG Over IP Activity," MPEG Meeting; Jul. 7-Nov. 7, 2014; Sapporo; Motion Picture Expert Group or ISO/I EC JTC1/SC29/WG11, No. m34329, Jul. 6, 2014, XP030062702, 8 pp.
Second Written Opinion of International Application No. PCT/US2016/020652, dated Jan. 20, 2017, 7 pp.
Response to Written Opinion dated May 25, 2016, from International Application No. PCT/US2016/020652, dated Aug. 17, 2016, 4 pp.
Luby et al., "Layered Coding Transport (LCT) Building Block", Network Working Group, IETF, RFC 5651, Oct. 2009, 34 pp.
Hoffman et al., "RTP Payload Format for MPEG1/MPEG2 Video," Network Working Group, IETF, RFC 2250, Jan. 1998, 14 pp.
Fielding et al, "Hypertext Transfer Protocol—HTTP/1.1," Network Working Group, IETF, RFC 2616, Jun. 1999, 165 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
"Text of ISO/IEC IS 23009-1 Media Presentation Description and Segment Formats", MPEG Meeting; Nov. 28, 2011-Dec. 2, 2012; Geneva; Motion Picture Expert Group or ISO/IEC JTC1/SC29/WG11, No. N12329, Jan. 6, 2012, XP030018824, 130 pp.
"Text of ISO/IEC 14496-12 4th edition", MPEG Meeting; Apr. 30-May 4, 2012; Geneva; Motion Picture Expert Group or ISOIIEC JTC1/SC29/WG11, No. N12640, Jun. 7, 2012, XP030019114, 2 pp.
"Part 14: MP4 file format," Information technology—Coding of audio-visual objects, ISO/IEC 14496-14, Nov. 15, 2003, 18 pp.
ISO/IEC 14496-15/FDIS, International Organization for Standardization Organization Internationale De Normalization ISO/IEC JTC1/SC29/WG11 Jan. 20, 2003, Coding of Moving Pictures and Audio, Aug. 11, 2003, 34 pp.
3GPP TS 26.244 V9.1.0, 3rd Generation Partnership Project; Technical Specification Group Services and System Aspects; Transparent end-to-end packet switched streaming service (PSS); 3GPP file format (3GP), (Release 9), Mar. 2010, 55 pp.
ATSC input document S33-1-171r2-ROUTE-final, "Real-Time Object Delivery over Unidirectional Transport (ROUTE)", Jan. 7, 2015, 48 pp.
Hughes, "ISO/IEC 23001-7 3rd Edition—Common encryption in ISO Base Media File Format Files", FDIS, ISO/IEC JTC1/SC29/WG11 N15501, Warsaw, Poland, Jun. 2015, 33 pp.

\* cited by examiner

FILE FORMAT BASED STREAMING WITH DASH FORMATS BASED ON LCT

This application claims the benefit of U.S. Provisional Application No. 62/128,380, filed Mar. 4, 2015, and U.S. Provisional Applicant No. 62/128,943, filed Mar. 5, 2015, the entire contents of each of which are hereby incorporated by reference.

TECHNICAL FIELD

This disclosure relates to storage and transport of encoded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265/MPEG-H Part 2 (also referred to as High Efficiency Video Coding (HEVC)), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) base media file format and extensions thereof, such as AVC.

SUMMARY

In general, this disclosure describes various techniques for accessing media data of one or more representations carried by layered coding transport (LCT) without using a manifest file, such as a media presentation description (MPD) for the representations. For example, an LCT Session Instance Description (LSID) may include at least some of the manifest file data used for start-up and/or continuous operation of a service for accessing the media data. For example, the LSID may include information indicating properties of the representations, Additionally or alternatively, packets of the LCT sessions may include LCT headers with data assigned that indicates how the packets relate to segments of the representations, e.g., which packets correspond to each segment. In this manner, a client device may initiate consumption of one or more of the representations without (or before) receiving the manifest file.

In one example, a method of receiving media data includes determining a plurality of representations of a Dynamic Adaptive Streaming over HTTP (DASH) media presentation from a layered coding transport (LCT) Session Instance Description (LSID), wherein the LSID includes information representative of a plurality of LCT sessions, each of the LCT sessions including data of a respective one of the representations, and initiating consumption of one or more of the representations of the DASH media presentation using the LSID and without using a manifest file for the DASH media presentation, wherein initiation consumption comprises receiving packets of the LCT sessions including portions of data of the one or more of the representations, and providing data of the packets to a media decoder.

In another example, a device for receiving media data includes one or more media decoders configured to decode media data, a network interface configured to receive a layered coding transport (LCT) Session Instance Description (LSID), wherein the LSID includes information representative of a plurality of LCT sessions, each of the LCT sessions including data of a respective one of a plurality of representations of a Dynamic Adaptive Streaming over HTTP (DASH) media presentation and data of one or more of the LCT sessions, and a processor configured to initiate consumption of one or more of the representations of the DASH media presentation using the LSID and without using a manifest file for the DASH media presentation, wherein to initiate consumption, the processor is configured to receive, via the network interface, packets of the LCT sessions including portions of data of the one or more of the representations, and provide data of the packets to the one or more media decoders.

In another example, a device for receiving media data includes means for determining a plurality of representations of a Dynamic Adaptive Streaming over HTTP (DASH) media presentation from a layered coding transport (LCT) Session Instance Description (LSID), wherein the LSID includes information representative of a plurality of LCT sessions, each of the LCT sessions including data of a respective one of the representations, and means for initiating consumption of one or more of the representations of the DASH media presentation using the LSID and without using a manifest file for the DASH media presentation, wherein the means for initiation consumption comprises means for receiving packets of the LCT sessions including portions of data of the one or more of the representations, and means for providing data of the packets to a media decoder.

In another example, a computer-readable storage medium has stored thereon instructions that, when executed, cause a processor of a device for receiving media data to determine a plurality of representations of a Dynamic Adaptive Streaming over HTTP (DASH) media presentation from a layered coding transport (LCT) Session Instance Description (LSID), wherein the LSID includes information representative of a plurality of LCT sessions, each of the LCT sessions including data of a respective one of the representations, and initiate consumption of one or more of the representations of the DASH media presentation using the LSID and without using a manifest file for the DASH media presentation, wherein the instructions that cause the processor to initiate consumption comprise instructions that cause the processor to receive packets of the LCT sessions including portions of data of the one or more of the representations, and provide data of the packets to a media decoder.

In another example, a method of sending media data includes constructing a layered coding transport (LCT) Session Instance Description (LSID) including information representative of a plurality of LCT sessions, each of the LCT sessions including data of a respective one of a plurality of representations of a Dynamic Adaptive Streaming over HTTP (DASH) media presentation, wherein the LSID indicates correspondences between the LCT sessions and the representations, outputting the LSID, and outputting data of the representations in the corresponding LCT sessions.

In another example, a device for sending media data includes a network interface for outputting data of a plurality of layered coding transport (LCT) sessions, and a processor configured to construct an LCT Session Instance Description (LSID) including information representative of a plurality of LCT sessions, each of the LCT sessions including data of a respective one of a plurality of representations of a Dynamic Adaptive Streaming over HTTP (DASH) media presentation, wherein the LSID indicates correspondences between the LCT sessions and the representations, output the LSID via the network interface, and output data of the representations in the corresponding LCT sessions via the network interface.

In another example, a device for sending media data includes means for constructing a layered coding transport (LCT) Session Instance Description (LSID) including information representative of a plurality of LCT sessions, each of the LCT sessions including data of a respective one of a plurality of representations of a Dynamic Adaptive Streaming over HTTP (DASH) media presentation, wherein the LSID indicates correspondences between the LCT sessions and the representations, means for outputting the LSID, and means for outputting data of the representations in the corresponding LCT sessions.

In another example, a computer-readable storage medium has stored thereon instructions that, when executed, cause a processor of a device for sending media data to construct a layered coding transport (LCT) Session Instance Description (LSID) including information representative of a plurality of LCT sessions, each of the LCT sessions including data of a respective one of a plurality of representations of a Dynamic Adaptive Streaming over HTTP (DASH) media presentation, wherein the LSID indicates correspondences between the LCT sessions and the representations, output the LSID, and output data of the representations in the corresponding LCT sessions.

DETAILED DESCRIPTION

Figure 1:
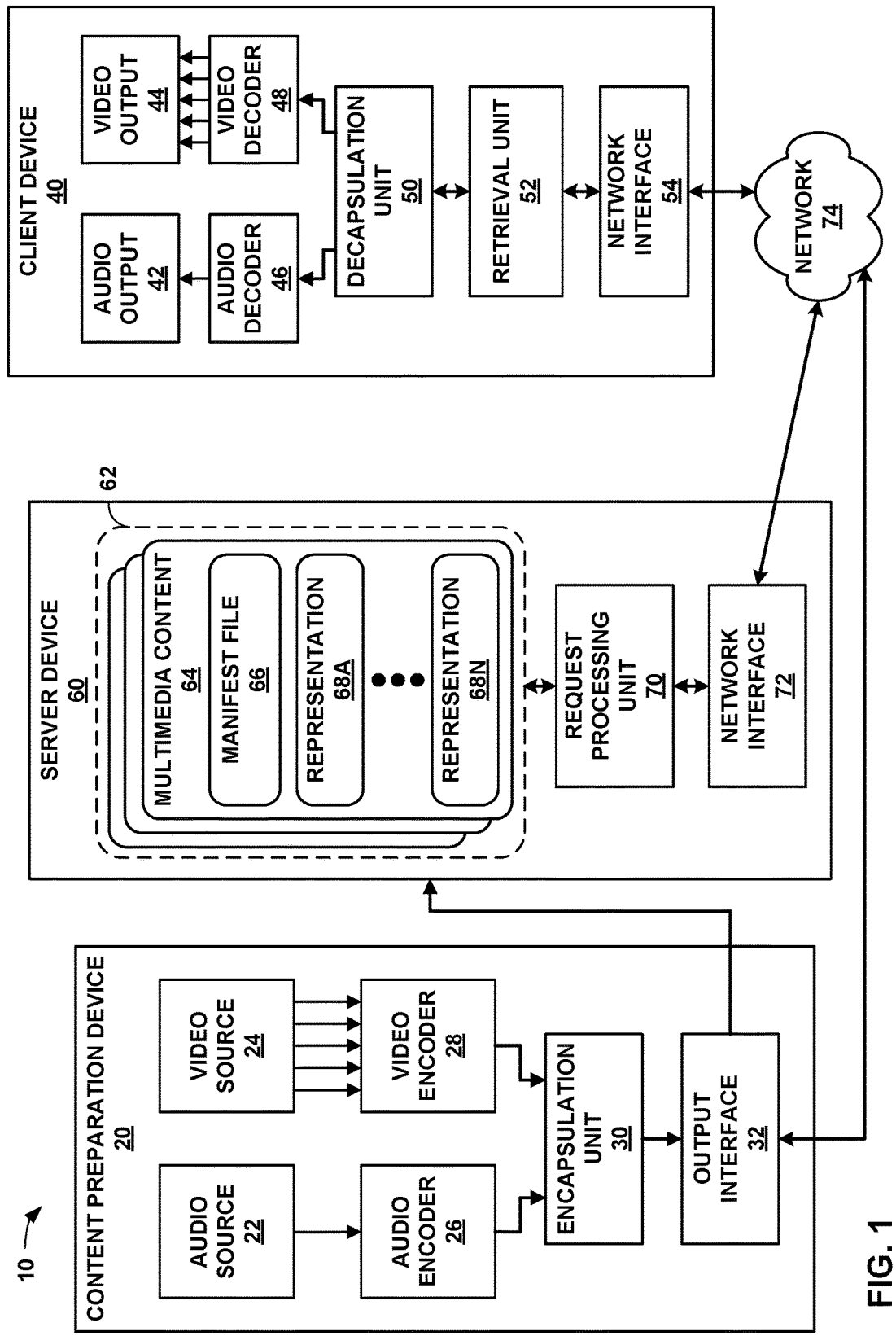
FIG. 1 is a block diagram illustrating an example system that implements techniques for streaming media data over a network.

In general, this disclosure describes techniques that enable the ability to use a unidirectional protocol, e.g., File Delivery over Unidirectional Transport (FLUTE), Real-Time Object Delivery over Unidirectional Transport (ROUTE), or Object Delivery for the Asynchronous Layered Coding and NACK-Oriented Reliable Multicast Protocols (FCAST), as well as Dynamic Adaptive Streaming over HTTP (DASH) segments based on the ISO base media file format (ISO BMFF) and possibly also other formats such as the MPEG-2 Transport Stream (TS), in order to create an IP-based broadcast media delivery system that supports delivery and playout of media streams that:

Are to be synchronized among each other (dealt by ISO BMFF).

Are to be randomly accessed (dealt by specific signalling in the delivery protocol).

Are to be played such that no re-buffering and stalling happens.

Are to be combined with media streams that are provided and offered on broadband and unicast.

Enable multi-program delivery and multiplexing.

Enable low start-up delays and fast channel changes.

Enable splicing content at the sender and at the receiver.

And provide all the features of DASH in a broadcast distribution system.

More particularly, the techniques of this disclosure allow reception of media data of one or more representations via Layered Coding Transport (LCT) sessions, without (or prior to) receiving a manifest file (such as a media presentation description (MPD)) for the representations. In this manner, the techniques of this disclosure may reduce latency associated with initiating consumption of the media data (e.g., performing service startup). That is, absent these techniques, a client device would need to await reception of the manifest file, which may cause poor user experience (e.g., viewing a black screen and/or hearing no audio playback). Using these techniques may reduce latency, such that the user experience may be improved (e.g., allowing faster playback of audio and/or video data).

The techniques of this disclosure may be applied to video files conforming to video data encapsulated according to any of ISO base media file format, Scalable Video Coding (SVC) file format, Advanced Video Coding (AVC) file format, Third Generation Partnership Project (3GPP) file format, and/or Multiview Video Coding (MVC) file format, or other similar video file formats. That is, segments of representations may be formed according to any of these various formats. In general, segments represent independently receivable media files of the corresponding representations.

In HTTP streaming, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes corresponds to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more periods. Periods may be defined by a Period element in the MPD. Each period may have an attribute start in the MPD. The MPD may include a start attribute and an availableStartTime attribute for each period. For live services, the sum of the start attribute of the period and the MPD attribute availableStartTime may specify the availability time of the period in UTC format, in particular the first Media Segment of each representation in the corresponding period. For on-demand services, the start attribute of the first period may be 0. For any other period, the start attribute may specify a time offset between the start time of the corresponding Period relative to the start time of the first Period. Each period may extend until the start of the next Period, or until the end of the media presentation in the case of the last period. Period start times may be precise. They may reflect the actual timing resulting from playing the media of all prior periods.

Each period may contain one or more representations for the same media content. A representation may be one of a number of alternative encoded versions of audio or video data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

FIG. 1 is a block diagram illustrating an example system 10 that implements the techniques of this disclosure for streaming media data over a network. The various elements of system 10 may generally correspond to similar elements of the examples shown in FIGS. 5 and 6, as discussed in greater detail below. Likewise, the components of client device 40 may generally correspond to the components of FIGS. 11, 12, and 14, as also discussed in greater detail below.

In the example of FIG. 1, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC and the upcoming High Efficiency Video Coding (HEVC) standard, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interoperability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. In the example of H.264/AVC (Advanced Video Coding), coded video segments are organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

The various elements of system 10 (e.g., client device 40, content preparation device 20, and/or server device 60) may be configured to perform the various techniques of this disclosure. In general, the example of system 10 includes various elements that may be configured to initiate the consumption of a DASH Media Presentation based on the ISO base media file format (ISO BMFF), or a segmented ISO BMFF file, for which the Segments are delivered through Layered Coding Transport (LCT) object delivery protocol, for example, the ROUTE protocol without the MPD (e.g., manifest file 66) and without the delivery of associated metadata between Transport Object Identifiers (TOIs) and URLs (such as the FDT, the EFDT, or the entity header in GFD or ROUTE) and the MPD-signaling is provided by other means, e.g., the LCT Session Instance Description (LSID) in ROUTE, the SDP in FLUTE, the LCT header, the ISO BMFF IS, or the like. That is, client device

40 may initiate consumption by performing service startup, which may include accessing a service entry point.

The elements of system 10 (such as client device 40) may also (additionally or alternatively) be configured to entirely consume a unidirectional stream, i.e., a broadcast distribution, under the above delivery assumptions.

The elements of system 10 may also (additionally or alternatively) be configured to initiate a DASH Media Presentation without the MPD (e.g., manifest file 66), but after initial startup and playout, the MPD may be received and processed (e.g., delivered by server device 60 and received by client device 40) in order to obtain richer information and to combine with broadband/unicast delivery.

The MPD may contain only absolutely necessary information for broadcast tuning in or channel change, where one or more of the following may apply:

When no MPD information is needed at all, the MPD can be empty.

Regular MPD copies (with some information that is not absolutely necessary, e.g., only needed for some enhancement or optimizations) are included sparsely at some random access points (RAPs), and between two regular MPD copies a lightweight MPD (with only absolutely necessary information) is included at each RAP.

The elements of system 10 may also (additionally or alternatively) be configured to use a target transmission time of each packet that is added to the ROUTE packet, reflecting a time when the receiver is consuming (decoding and rendering) the data relative to other data in the same ROUTE session, wherein one or more of the following apply to the target transmission time:

By which this time is signaled in the LCT header.
By which this time is signaled in the CC header.
By which this time is signaled in an extension header.
Wherein this time is a relative time.
Wherein this time is an absolute wall-clock time such as a network time protocol (NTP) time.
Wherein this time is a relative time and a release time is signalled in a packet, and the packet is only released for consuming when the release time is less than or equal to the target transmission time.

The elements of system 10 may also (additionally or alternatively) be configured to use a flag, added to the ROUTE packet, that reflects whether the receiver is consuming (decoding and rendering) the data contained in the packet when it is present, wherein one or more of the following may apply:

When the flag is equal to 1, the packet is kept by the sender, and not passed to the receiver for consumption.
When the flag is equal to 0, the packet is released by the sender to the receiver for consumption.
The value of the flag is required to be equal to 1 for the last packet of an object.

Thus, system 10 may implement a design that is an advantageous approach for bandwidth efficiency, initial start-up delay, simplicity, robustness, extensibility and complexity reasons without any significant downsides.

In this manner, and as explained in greater detail below, server device 60 represents an example of a device for sending media data including a network interface for outputting data of a plurality of layered coding transport (LCT) sessions, and a processor configured to construct an LCT Session Instance Description (LSID) including information representative of a plurality of LCT sessions, each of the LCT sessions including data of a respective one of a plurality of representations of a Dynamic Adaptive Streaming over HTTP (DASH) media presentation, wherein the LSID indicates correspondences between the LCT sessions and the representations, output the LSID via the network interface, and output data of the representations in the corresponding LCT sessions via the network interface.

Likewise, client device 40 represents an example of a client device for receiving media data including one or more media decoders configured to decode media data, a network interface configured to receive a layered coding transport (LCT) Session Instance Description (LSID), wherein the LSID includes information representative of a plurality of LCT sessions, each of the LCT sessions including data of a respective one of a plurality of representations of a Dynamic Adaptive Streaming over HTTP (DASH) media presentation and data of one or more of the LCT sessions, and a processor configured to initiate consumption of one or more of the representations of the DASH media presentation using the LSID and without using a manifest file for the DASH media presentation, wherein to initiate consumption, the processor is configured to receive, via the network interface, packets of the LCT sessions including portions of data of the one or more of the representations, and provide data of the packets to the one or more media decoders.

Figure 2:
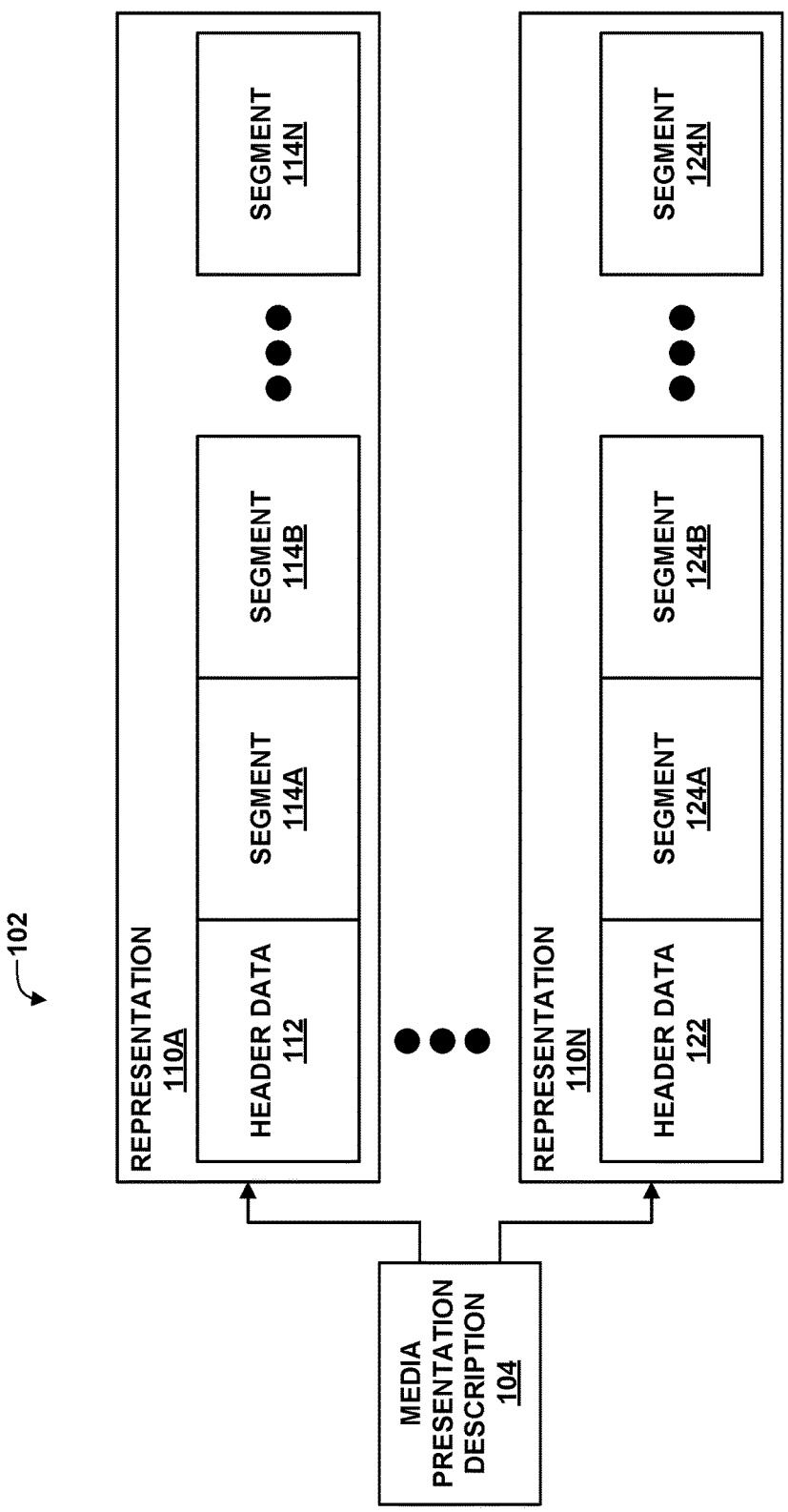
FIG. 2 is a conceptual diagram illustrating elements of example multimedia content.

FIG. 2 is a conceptual diagram illustrating elements of example multimedia content 102. Multimedia content 102 may correspond to multimedia content 64 (FIG. 1), or another multimedia content stored in storage medium 62. In the example of FIG. 2, multimedia content 102 includes media presentation description (MPD) 104 and a plurality of representations 110A-110N. Representation 110A includes optional header data 112 and segments 114A-114N (segments 114), while representation 110N includes optional header data 122 and segments 124A-124N (segments 124). The letter N is used to designate the last movie fragment in each of representations 110A, 110N as a matter of convenience. In some examples, there may be different numbers of movie fragments between representations 110A, 110N.

MPD 104 may comprise a data structure separate from representations 110A-110N. MPD 104 may correspond to manifest file 66 of FIG. 1. Likewise, representations 110A-110N may correspond to representations 68 of FIG. 1. In general, MPD 104 may include data that generally describes characteristics of representations 110A-110N, such as coding and rendering characteristics, adaptation sets, a profile to which MPD 104 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 112, when present, may describe characteristics of segments 114, e.g., temporal locations of random access points (RAPs, also referred to as stream access points (SAPs)), which of segments 114 includes random access points, byte offsets to random access points within segments 114, uniform resource locators (URLs) of segments 114, or other aspects of segments 114. Header data 122, when present, may describe similar characteristics for segments 124. Additionally or alternatively, such characteristics may be fully included within MPD 104.

Segments 114, 124 include one or more coded video samples, each of which may include frames or slices of video data. Each of the coded video samples of segments 114 may have similar characteristics, e.g., height, width, and bandwidth requirements. Such characteristics may be described by data of MPD 104, though such data is not illustrated in the example of FIG. 2. MPD 104 may include characteristics as described by the 3GPP Specification, with the addition of any or all of the signaled information described in this disclosure.

Each of segments 114, 124 may be associated with a unique uniform resource locator (URL). Thus, each of segments 114, 124 may be independently retrievable using a streaming network protocol, such as DASH. In this manner, a destination device, such as client device 40, may use an HTTP GET request to retrieve segments 114 or 124. In some examples, client device 40 may use HTTP partial GET requests to retrieve specific byte ranges of segments 114 or 124.

Figure 3:
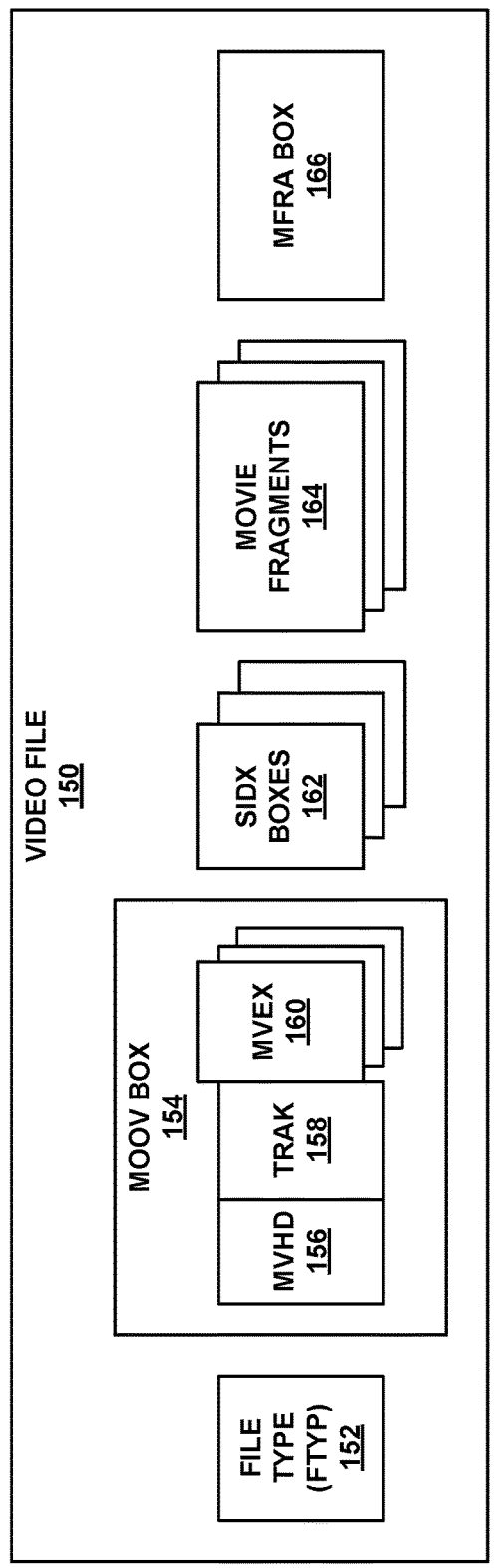
FIG. 3 is a block diagram illustrating elements of an example video file, which may correspond to a segment of a representation.

FIG. 3 is a block diagram illustrating elements of an example video file 150, which may correspond to a segment of a representation, such as one of segments 114, 124 of FIG. 2. Each of segments 114, 124 may include data that conforms substantially to the arrangement of data illustrated in the example of FIG. 3. Video file 150 may be said to encapsulate a segment. As described above, video files in accordance with the ISO base media file format and extensions thereof store data in a series of objects, referred to as "boxes." In the example of FIG. 3, video file 150 includes file type (FTYP) box 152, movie (MOOV) box 154, segment index (sidx) boxes 162, movie fragment (MOOF) boxes 164, and movie fragment random access (MFRA) box 166. Although FIG. 3 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, movie fragment boxes 164, and/or MFRA box 166.

Figure 7:
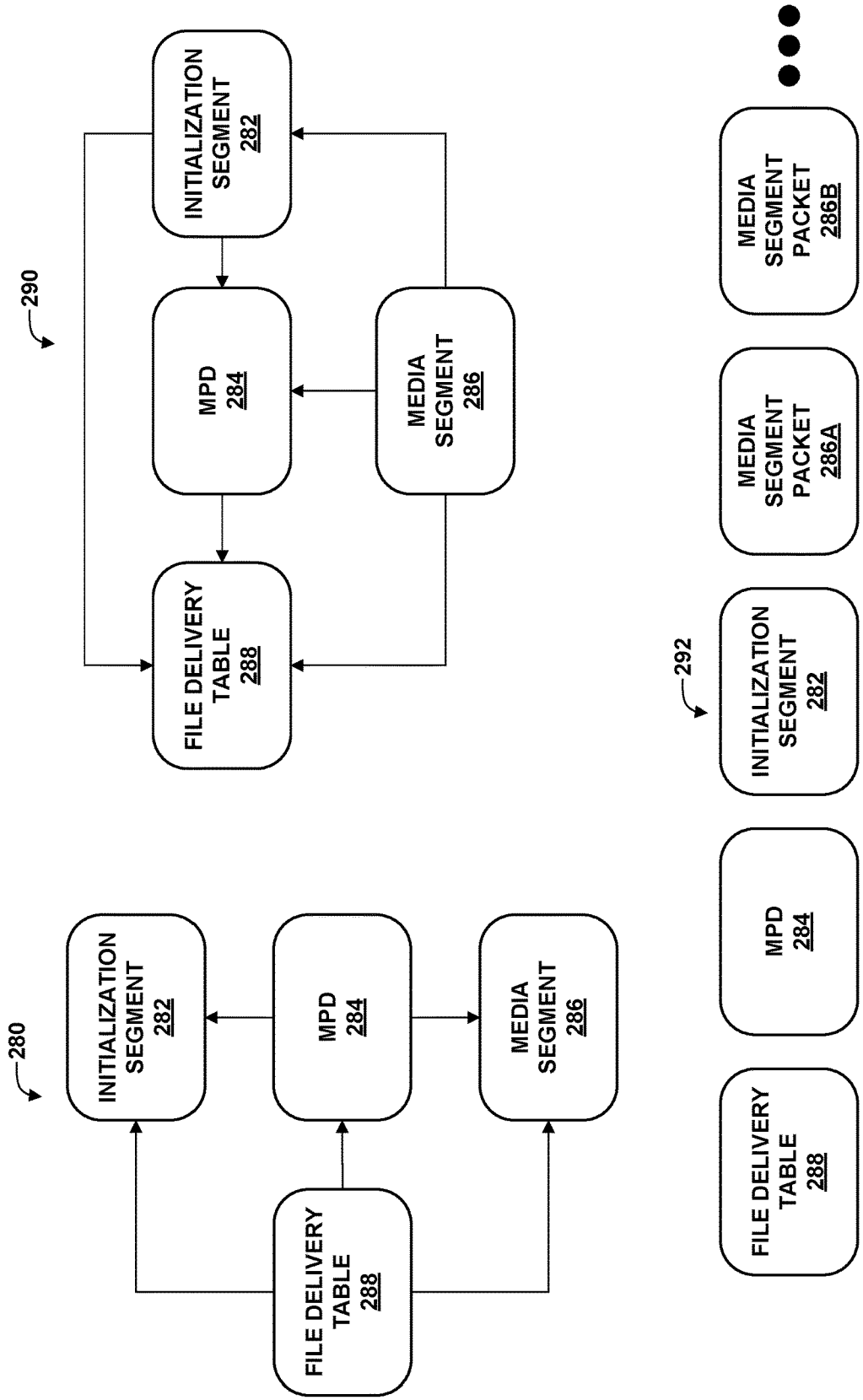
FIG. 7 is a conceptual diagram that shows different aspects of the service entry in the example of DASH over FLUTE.

In some examples, a Segment, such as video file 150, may include an MPD update box (not shown) before FTYP box 152. The MPD update box may include information indicating that an MPD corresponding to a representation including video file 150 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 150, where the STYP box may define a segment type for video file 150. FIG. 7, discussed in greater detail below, provides additional information with respect to the MPD update box.

MOOV box 154, in the example of FIG. 3, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158 and/or sidx boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 2) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that video file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above, encapsulation unit 30 may store a sequence data set in a video sample that does not include actual coded video data. A video sample may generally correspond to an access unit, which is a representation of a coded picture at a specific time instance. In the context of AVC, the coded picture includes one or more VCL NAL units which contains the information to construct all the pixels of the access unit and other associated non-VCL NAL units, such as SEI messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in video file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of movie fragments 164 may include a movie fragment header box (MFHD, not shown in FIG. 3). The MFHD box may describe characteristics of the corresponding movie fragment, such as a sequence number for the movie fragment. Movie fragments 164 may be included in order of sequence number in video file 150.

MFRA box 166 may describe random access points within movie fragments 164 of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments 164 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

Figure 4:
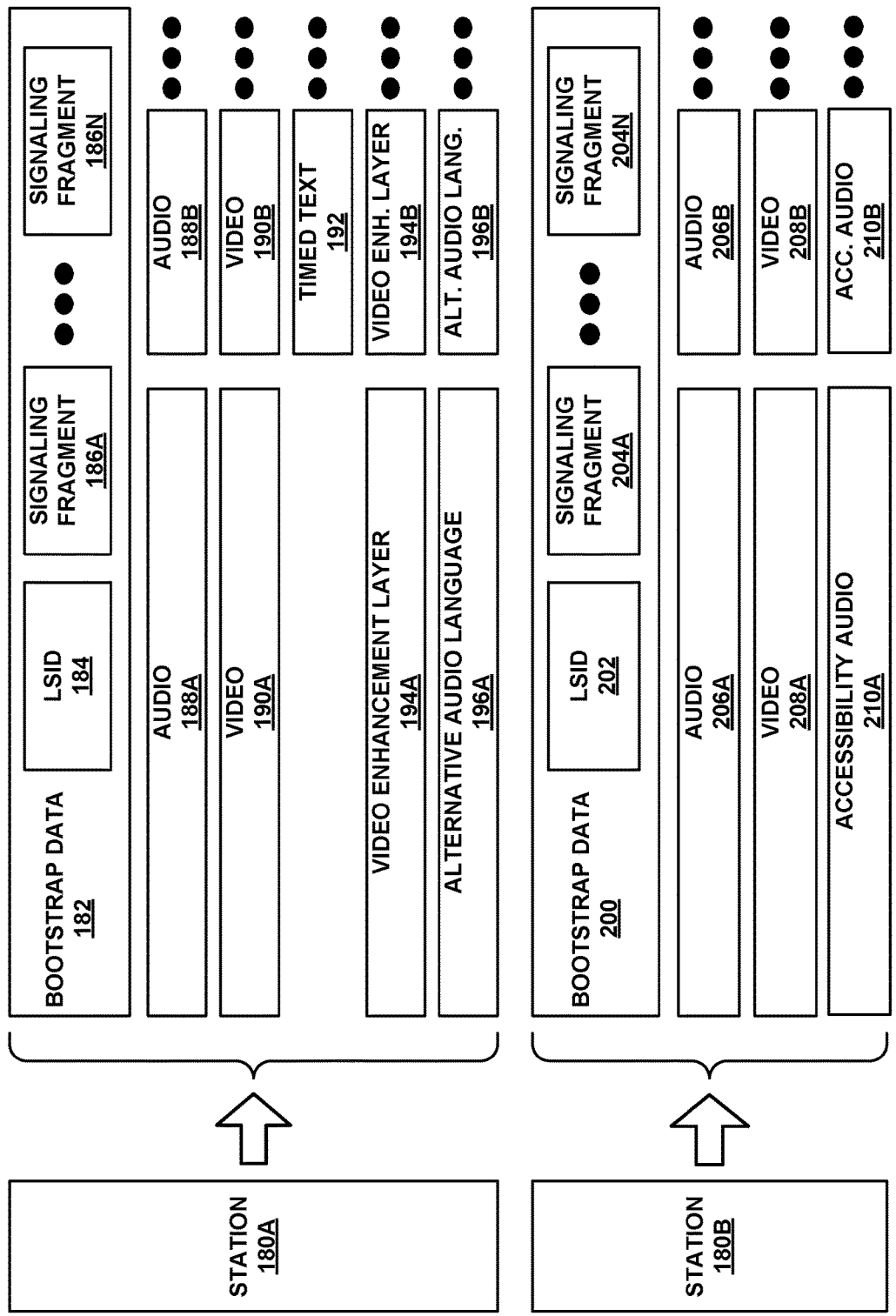
FIG. 4 is a conceptual diagram illustrating an example scenario that often arises in broadcast delivery.

FIG. 4 is a conceptual diagram illustrating an example scenario that often arises in broadcast delivery. The scenario may be described as follows:

- Multiple Services are distributed (typically on different channels).
- Services have broadcast components and may have additional unicast/broadband components.
- Typically, the services include different components, e.g., video, audio, subtitle, alternative audio, alternative video, etc., that are described by metadata.
- On broadcast, each component may be sent on a different transport session, such that the components can be selected/filtered.
- The components and services are multiplexed on packet level.

In the example of FIG. 4, there are two separate media broadcasting stations 180A, 180B. Station 180A provides bootstrap data 182, including LSID 184 and related signaling fragments 186A-186N (signaling fragments 186). Station 180A also provides audio data 188 (including audio data 188A and 188B shown in FIG. 4), video data 190 (including video data 190A and 190B in FIG. 4), timed text data 192, video enhancement layer data 194 (including video enhancement layer data 194A and 194B shown in FIG. 4), and alternative audio language data 196 (including alternative audio language data 196A and 196B shown in FIG. 4). In one example, station 180A provides bootstrap data 182 via User Datagram Protocol (UDP) using Transport Session Identifier (TSI) 0, audio data 188 via UDP using TSI 1, video data 190 via UDP using TSI 2, video enhancement layer data 194 via broadband, and alternative audio language data 196 via HTTP.

Station 180B, in this example, provides bootstrap data 200, including LSID 202 and related signaling fragments 204A-204N (signaling fragments 204). Station 180B also provides audio data 206 (including audio data 206A and 206B shown in FIG. 4), video data 208 (including video data 208A and 208B in FIG. 4), and accessibility audio data 210 (including accessibility audio language data 210A and 210B shown in FIG. 4). In one example, station 180A provides bootstrap data 182 via User Datagram Protocol (UDP) using Transport Session Identifier (TSI) 0, audio data 188 via UDP using TSI 1, video data 190 via UDP using TSI 2, video enhancement layer data 194 via broadband, and alternative audio language data 196 via unicast (e.g., according to HTTP).

In general, stations 180A, 180B may include devices similar to content preparation device 20 and server device 60 of FIG. 1. In particular, stations 180A, 180B may include devices separate from each other that perform functionality similar to that attributed to content preparation device 20 and/or server device 60. Additionally or alternatively, stations 180A, 180B may prepare media data and provide the prepared media data to a content delivery network (CDN), local station affiliates, cable companies, or other content distributors, which may distribute the media data via network broadcast or unicast or over-the-air transmission.

Although not shown in FIG. 4, the data streams (i.e., bootstrap data 182, 200, audio data 188, 206, video data 190, 208, timed text data 192, video enhancement layer data 194, alternative audio language data 196, and accessibility audio 210) may be organized into Segments, such as Initialization Segments (ISs) including static configuration data and a sequence of media segments containing encoded samples of media data. The segments may contain sufficient information for timing, such that the data can be decoded and presented jointly with other Representations for synchronized playout. For example, segments from audio data 188 and video data 190 may include synchronization data such that audio and video is synchronized during playback.

Segments follow specific rules in accordance with, e.g., DASH. Namely, segments are data objects, and content preparation device 20 or server device 60 may generate segments independently of other segments. Segments follow in decoding order, i.e., all data contained in Segments with a lower number has lower (i.e., earlier) decode times than segments with higher segment numbers. In addition, content may be spliced at certain positions. This results in a new Period, for which each Representation will receive a new IS. There are other cases when a new IS may be provided, but the timeline is continuous. This may be the case, for example, if the IS includes new metadata.

Figure 5:
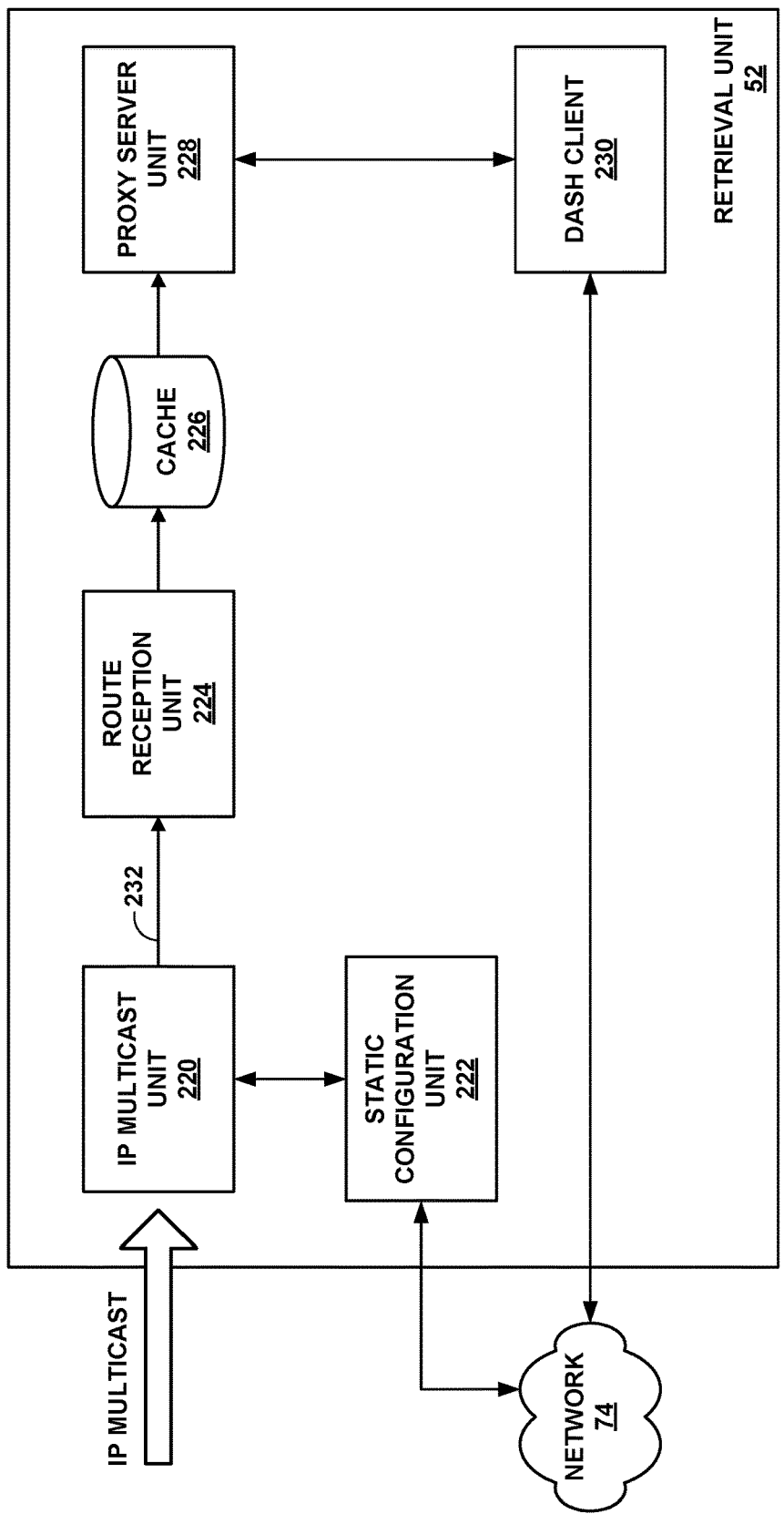
FIG. 5 is a conceptual diagram illustrating an example system that may perform the techniques of this disclosure.

FIG. 5 is a block diagram illustrating example components of retrieval unit 52 of client device 40 of FIG. 1. In this example, retrieval unit 52 includes IP multicast unit 220, static configuration unit 222, ROUTE reception unit 224, cache 226, proxy server unit 228, and DASH client 230. In general, DASH client 230 may retrieve segments of one or more representations via network 74 (e.g., from server device 60) using unicast requests. Additionally or alternatively, retrieval unit 52 may use IP multicast unit 220 to subscribe to an IP multicast, to receive IP multicast data including segments of one or more representations. IP multicast unit 220 may pass received segments 232 to ROUTE reception unit 224, which may store the received segments to cache 226. DASH client 230 may then request the segments from proxy server unit 228. In this manner, DASH client 230 may request segments either from an IP address of server device 60, or from a localhost address of client device 40 that includes retrieval unit 52. In either case, DASH client 230 may retrieve the segments using HTTP Get or partial Get requests. Thus, retrieval unit 52 may generally receive segments via unicast or IP multicast.

If data is made available via unicast, then the available data is described in the manifest file (e.g., the Media Presentation Description (MPD)) using DASH concepts such as Media Presentation, Periods, Adaptation Sets, Representations and Segments. In basic deployments for unidirectional broadcast delivery of DASH Media Presentations, it is proposed to distribute the MPD and the Segments as regular data objects using an object delivery protocol such as ROUTE, FLUTE or FCAST. The object receiver may then use the recovered objects in order to provide a Media Presentation from a local server to a DASH client as shown in FIGS. 1 and 5 (using ROUTE as example, but such techniques are also applicable to FLUTE or FCAST as well). The segments are distributed such that the URLs in the MPD are assigned to objects delivered in the object delivery protocol, for example, through a File Delivery Table (FDT), an Extended FDT (EFDT), or as part of the object using HTTP entity headers.

The sender (e.g., server device 60 or a similar device) delivers the objects such that the segments are received at client device 40 prior to respective segment availability times announced in the MPD. Server device 60 (or content preparation device 20) packetizes the segments and multiplexes the packets accordingly. The objects may be separated by different Transport Object Identifiers (TOIs) and the assignment to URLs is provided as mentioned above. In a more sophisticated sending setup, all Segments of one Representation are delivered in a dedicated session, for example, using a dedicated User Datagram Protocol (UDP) port or a dedicated Layered Coding Transport (LCT) session identified by a unique Transport Session Identifier (TSI). This assignment permits the receiver to select or ignore entire sessions based on the selection of Representations by DASH client 230.

However, provisioning of a Media Presentation over broadcast may create some challenges for the sender, as the sender may need to predict the delivery and processing time in order to properly set the segment availability times in the MPD. If, for some reason, the distribution system has more or less delay than expected, the performance of DASH client 230 or other player may be adversely impacted. The playback start up may be too soon or too late. Playback starting up too soon may result in a stall of media playback, and playback starting up too late may result in a slower channel change and an increased end-to-end latency than otherwise possible. Another issue is that, prior to DASH client 230 making use of the Segments and the contained media, DASH client 230 may need to receive the FDT (or an equivalent data structure) and the MPD. For frequent random access points, this may increase the overhead from metadata.

Figure 6:
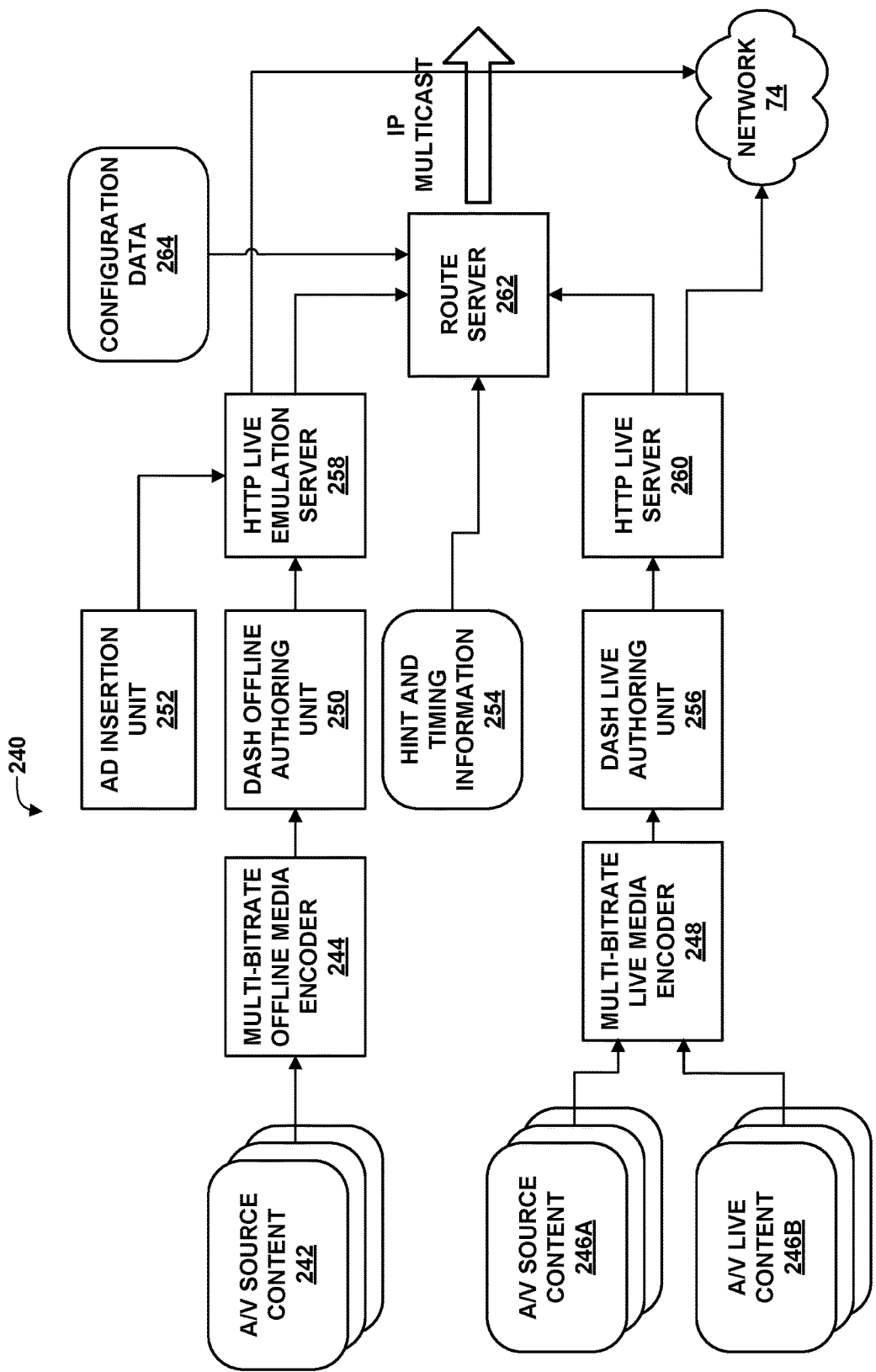
FIG. 6 is a conceptual diagram illustrating an example system that may perform the techniques of this disclosure.

As discussed in greater detail above and below, respectively, FIGS. 1 and 6 illustrate example sending infrastructures. More particularly, FIG. 6 is a block diagram illustrating an example of a basic sender architecture 240 that provides different sending options in accordance with techniques of this disclosure. In this example, sender architecture 240 includes multi-bitrate offline media encoder 244, multi-bitrate live media encoder 248, advertisement (ad) insertion unit 252, DASH offline authoring unit 250, DASH live authoring unit 256, HTTP live emulation server 258, HTTP live server 260, and ROUTE server 262. In this example, multi-bitrate offline media encoder 244 encodes one or more sets of audio/video (A/V) source content 242, while multi-bitrate live media encoder 248 encodes either or both of A/V source content 246A and A/V live content 246B. A/V source content 246A may represent pre-recorded content, while A/V live content 246B may represent live content being captured on the fly, e.g., a live news event, a sporting event, or other such live event.

Multi-bitrate offline media encoder 244 provides encoded media content to DASH offline authoring unit 250. DASH offline authoring unit 250 may generally prepare encoded media data for transport via, e.g., DASH. For example, for video data, DASH offline authoring unit 250 may prepare segments including a set of encoded video frames, which may include a random access point (RAP) video frame. Ad insertion unit 252 may prepare advertisement content for insertion at appropriate points of a media stream prepared by HTTP live emulation server 258. Likewise, DASH offline authoring unit 250 may provide prepared segments of one or more media representations to HTTP live emulation server 258.

In general, HTTP live emulation server 258 emulates a live media server, such as HTTP live server 260. For example, HTTP live emulation server 258 may signal segment availability times for segments of various representations (e.g., audio and video representations, as well as timed text representations in some examples). HTTP live emulation server 258 may provide the segments to ROUTE server 262, which may output the segments at particular times via ROUTE using IP multicast, based on hint and timing information 254. Additionally or alternatively, ROUTE server 262 may receive live DASH content from HTTP live server 260, which receives DASH content from DASH live authoring unit 256, which may prepare the live DASH content from encoded media data received from multi-bitrate live media encoder 248. Although a single multi-bitrate live media encoder 248 is shown in this example, it should be understood that a plurality of encoders may be employed for encoding live media data, in some examples.

Sender architecture 240 may provide either or both of On-Demand content as a pseudo-live service and/or a live service generated using DASH. In addition, sender architecture 240 may include tools that support advertisement (ad) insertion, such as ad insertion unit 252. Another option is to add some robustness to DASH, for example, by sending multiple Periods in order to permit resynchronization using the MPD level and/or the Segment level. The content may be made available over an HTTP service such that clients that are connected via unicast (e.g., through network 74) may access all or parts of the service through unicast. One example use case is the distribution through a file delivery protocol. That is, sender architecture 240 may deliver the generated DASH objects (MPD, Segments, or other data objects) through a file delivery protocol, e.g., FLUTE, FCAST, MPEG Media Transport (MMT) Generic File Delivery (GFD), or ROUTE. In the case of live streaming, use of ROUTE may be preferable, as ROUTE supports real-time capabilities and maps the objects appropriately to the packets delivered over IP-multicast and potentially then over a broadcast physical layer such as DVB-T2 with Generic Stream Encapsulation (GSE) or an ATSC 3.0 defined technology.

Typically, for Multimedia Broadcast Multicast Service (MBMS), enhanced MBMS (eMBMS), and ATSC 3.0, a top-down approach for the service entry is considered:
- There may be a service entry point, e.g., an HTML-5 page containing an MPD or an MPD itself
- The streaming service may be described by an MPD that contains multiple media components, each documented in one or more Adaptation Sets for proper selection, including metadata, rating, accessibility, etc.
- Each Adaptation Set may contain one or multiple Representations.
- Certain Representations are available on broadcast and build a basic service.
- Others are available on unicast, in order to enrich and enhance the presentation.
- In order to bootstrap the service, the MPD is necessary and the MPD controls the timing and playout.

The following has been considered as data for random access:
- For DASH over FLUTE as defined in MBMS:
    - The assumption is that certain metadata fragments, namely the User Service Description Bundle (USDB) and Session Description Protocol (SDP), are static and in the cache.
    - The data that needs to be acquired in real time are the following: FDT Instance, MPD, IS, and Media Segment starting with a closed-Group of Pictures (GOP) random access point (RAP). The closed-GOP RAP requirement is a restriction of the deployments today. The collection of necessary data is referred to as a group.
    - The first packet of the FDT is the first packet of a group, i.e., this packet needs to be received and then the following remaining packets that are associated to this group.
    - In order to potentially hand the data to the DASH client for playout, at least a full segment needs to be received, i.e., only after full reception the segment is "available" and can be scheduled for being requested by the DASH client. The DASH client will then progress and schedule the playout of the segment either by generating an appropriate buffer or by adhering to the instructions from the suggested Presentation delay in the MPD.
    - Note that this procedure is equivalent to the segment based DASH over ROUTE.

FIG. 7 is a conceptual diagram illustrating examples of different aspects of service entry in the example of DASH over FLUTE. In particular, FIG. 7 illustrates an example service entry 280, in which Internet protocol (IP) address and port along with MPD URL referencing may be used to retrieve data. In particular, service entry 280 illustrates that a client device, such as client device 40, may use file delivery table (FDT) 288 to retrieve MPD 284, and then use FDT 288 and MPD 284 to retrieve initialization segment 282 and media segment 286.

FIG. 7 also illustrates processing dependency 290 between these various elements. In particular, FDT 288 is independent, MPD 284 is dependent upon FDT 288, initialization segment 282 is dependent upon FDT 288 and MPD 284, and media segment 286 is dependent upon each of FDT 288, MPD 284, and initialization segment 282.

FIG. 7 further illustrates a typical sending order 292 from left-to-right. Because of processing dependency 290, according to typical sending order 292, FDT 288 is sent before MPD 284, which is sent before initialization segment 282, which is sent before one or more media segment packets 286A, 286B (which form all or part of media segment 286).

For DASH over ROUTE:
- In this case the assumption is that the LCT Session Instance Description (LSID) is available in a receiver device's cache, i.e., the receiver has information about the scheduled sessions and what is assigned to each of the LCT transport sessions.
- The data to be acquired in real time may include the following: EFDT Instance, MPD, IS, and Media Segment starting with a closed-GOP RAP. The closed-GOP RAP requirement is a restriction of the deployments today. The collection of necessary data is referred to as a group. In the discussion of this disclosure, the removal of the EFDT and the MPD is proposed.
- The EFDT is the first packet of a group, i.e., this packet needs to be received and then the following remaining packets that are associated to this group.
- In one operation mode, the segment-based reception mode as discussed above would be feasible. However, as ROUTE supports Media Delivery Event (MDE) based delivery, the DASH client and/or the ISO BMFF processing engine may initiate playout earlier at the time when a sufficiently large prefix of the media segment is received. In this case in order to potentially hand the data to the DASH client for playout, the MDE needs to be available and can be scheduled for being requested by the DASH client. The DASH client will then progress and schedule the playout of the prefix of the Media Segments to speed up the initial delay. What is relevant and needs to be considered is a way that the availability and decode times (typically identical) are properly derived.

Figure 8:
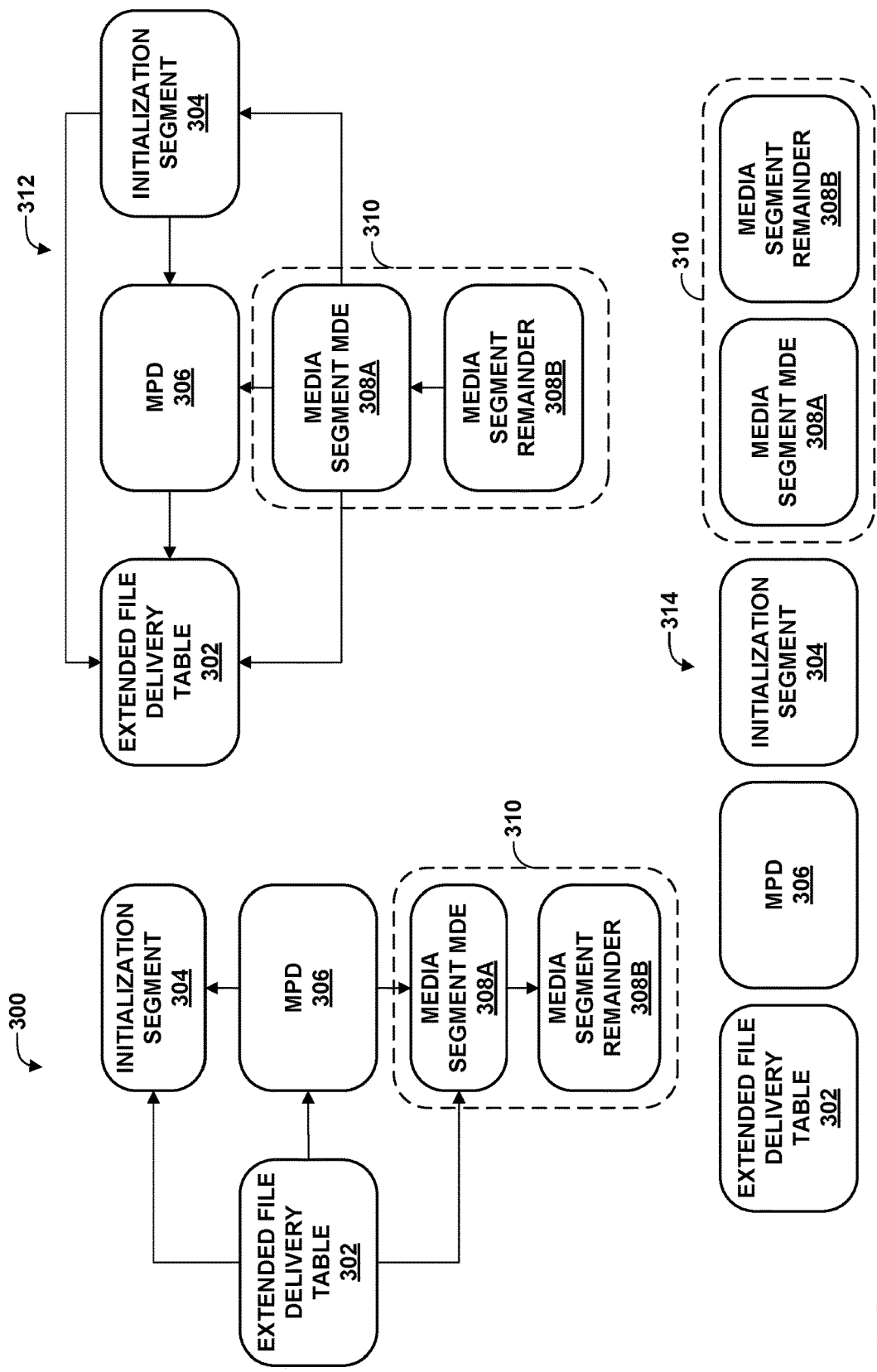
FIG. 8 is a conceptual diagram that shows different aspects of the service entry for an example of DASH over ROUTE.

FIG. 8 is a conceptual diagram that shows another set of example aspects of a service entry 300 in an example of delivery of DASH data over ROUTE. In this example, an extended FDT (EFDT) 302 contains a mapping of TOIs to URLs and the Content Type for MPD 306, Initialization Segment 304, and Media Segment 310 (formed by media segment media delivery event (MDE) 308A and media segment remainder 308B). From a processing point of view (that is, as shown in processing dependency 312), access to Media Segment 310 with the media data depends on initialization segment 304, MPD 306, and EFDT 302. Initialization segment 304 depends on processing MPD 306 and EFDT 302. And the processing of MPD 306 depends on the processing of EFDT 302. In order to enable such processing, the sending order 314 of packets may be as shown in FIG. 7, i.e. EFDT 302, then MPD 306, then initialization segment 304, and then Media Segment Packets (e.g., media segment MDE 308A, followed by media segment remainder 308B).

The specific reception for ROUTE has been documented as follows:
- The LSID describes the IP/port combination and different LCT sessions.

Different media components represented in segmented ISO BMFF files are associated to and uniquely assigned to a combination of IP/port/TSI.

The service is described by an MPD URL.

The ROUTE receiver retrieves objects for a component/service from channel.

In the reception of the objects, the ROUTE receiver assigns a URL to each object using the FDT/EFDT (or possibly the entity mode).

DASH client gets MPD URL, fetches it from local cache and starts consuming the segments based on the URLs in the MPD.

The timing is controlled by the MPD and DASH client: the segments have no timing assigned.

In an alternative approach, the following may apply:

The lower-layer signaling provides sufficient information in order to start the service without the MPD.

If unicast is added or if richer selection is necessary, and MPD is consulted, the MPD may still be a unified MPD, but treated as not necessary for startup. The MPD may even be configured such that for broadcast-only, no MPD is used, and also, the necessity of URL-binding is not necessary. In this manner, these techniques may avoid the need of the FDT, EFDT, or other means to bind URLs to objects.

This disclosure describes an example design similar to this approach, which may provide advantages for bandwidth efficiency, initial start-up, simplicity, robustness, extensibility and complexity reasons, without significant downsides. In order to maintain compatibility with existing services and address different use cases, the following approach may be considered:

The service signaling provides an indication on which of the following approaches can be taken:
1. The receiver needs the MPD even for startup, i.e., the DASH client must not be started and the service startup must not be done without the MPD. This would basically replicate the current approach.
2. The service provider provides sufficient signalling such that startup without the MPD is possible and permitted, but the MPD is also provided and describes richer content offerings and alternatives.
3. The service provider does not provide an MPD at all, the service is fully described by the lower-layer signalling, and no enriched information is enabled. This would prevent a hybrid broadcast/broadband service.

Example services for the different cases:
1. Encrypted service with detailed information in MPD, using the first approach.
2. Free A/V service with unicast components that can enrich service, using the second approach.
3. Simple Free-to-Air A/V service with no need of MPD, using the third approach.

The following problems may occur with the top down approach that distributes the MPD as the entry point:

DASH Media Formats are distributed over a Broadcast distribution.

In order to startup the session, several data objects (lower layer signaling, session description, FDT/EFDT/ equivalent methods, MPD, IS and at least some portion of the media segment) need to be received in order to randomly access the data and to schedule the playout.

The selection of Media and the time control is in the MPD, so it is required to receive the MPD before start-up and to receive the metadata to identify the MPD.

Another issue is that the MPD, if unmodified, needs to be generated at the sender in a way that the timing at the receiver can be predicted.

Another issue is that the MPD needs to be sent with every Random access point in every component in order to access video or audio quickly.

Yet another issue is that the FDT or EFDT is needed in order to be able to map the URLs.

Finally, the MPD and the metadata are typically formatted according to XML, and the unified MPD describes the entire service, including all components as well as all unicast/broadband delivered data. This may make the MPD unnecessarily large while at the start only the broadcast information may be required.

The techniques of this disclosure may overcome any or all of the problems discussed above.

For example, a receiving device (e.g., client device 40) may be configured to operate (that is, receive, process, and decode media data) without the EFDT, FDT, and/or MPD in a unidirectional/broadcast mode. In particular, client device 40 may receive alternative versions of the information from these data structures that would otherwise be necessary for start-up and/or permanent operation by other means.

Figure 9:
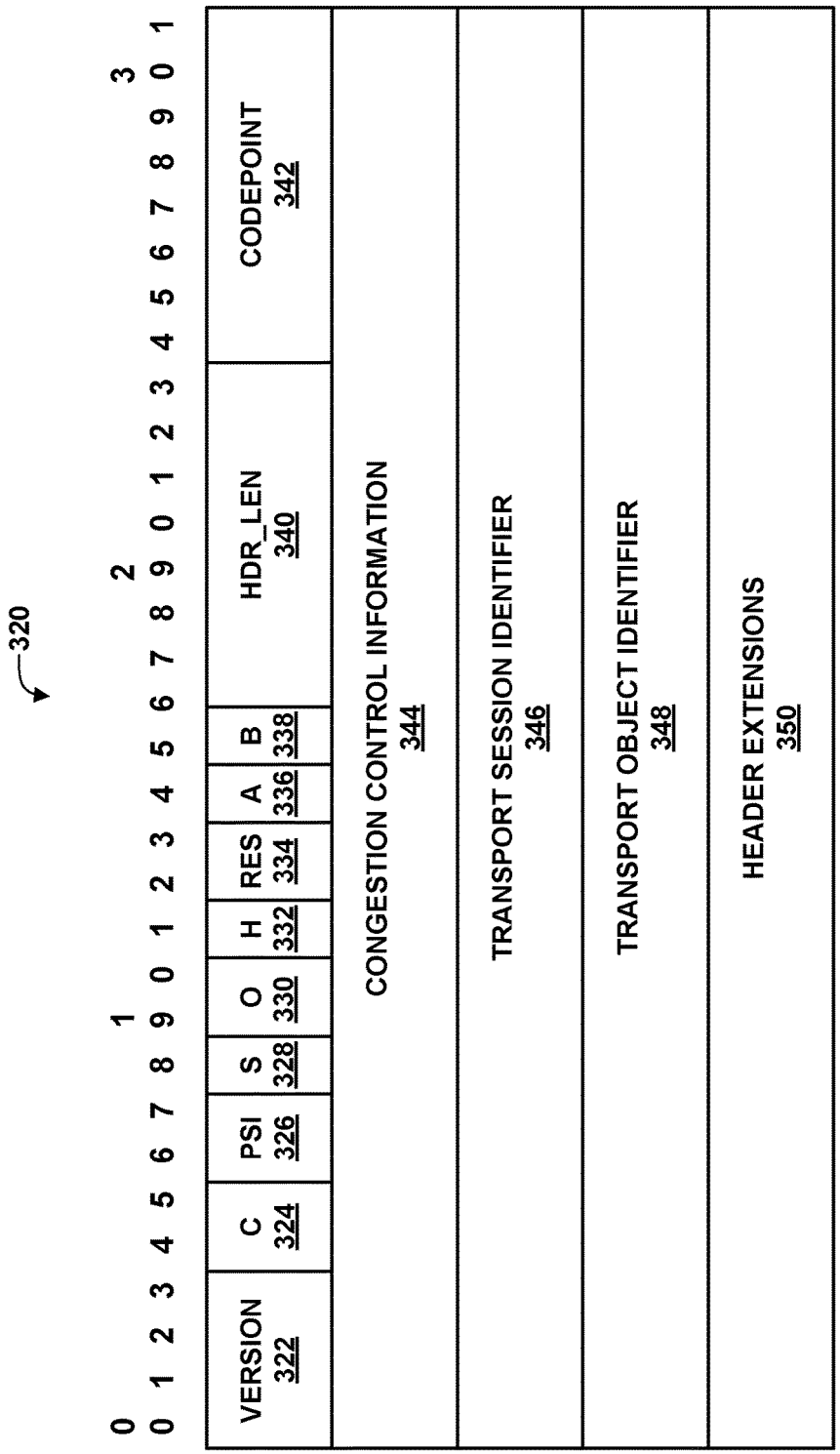
FIG. 9 is a conceptual diagram illustrating an example set of header fields according to RFC 5651 that may be used to carry data according to the techniques of this disclosure.

FIG. 9 is a conceptual diagram illustrating fields of LCT header 320 in accordance with RFC 5651 that may be used to carry data according to the techniques of this disclosure. In particular, LCT header 320 includes version field 322, congestion control flag 324, protocol-specific indication (PSI) field 326, transport session identifier flag (S) 328, transport object identifier (O) flag 330, half-word (H) flag 332, reserved (RES) field 334, close session (A) flag 336, close object (B) flag 338, LCT header length (HDR_LEN) field 340, codepoint field 342, congestion control information 344, transport session identifier 346, transport object identifiers 348, and header extensions field 350.

The values of version field 322, congestion control flag 324, protocol-specific indication (PSI) field 326, transport session identifier flag (S) 328, transport object identifier (O) flag 330, half-word (H) flag 332, reserved (RES) field 334, close session (A) flag 336, close object (B) flag 338, LCT header length (HDR_LEN) field 340, codepoint field 342, congestion control information 344, transport session identifier 346, and transport object identifier 348 may be set according to RFC 5651, and according to the techniques of this disclosure, as discussed below. Header extension field 350 may be set according to the techniques of this disclosure.

The following functionalities are available and may possibly be used, in order to support the delivery of information that is otherwise provided in the MPD and/or EFDT. The fields that may be used to carry data according to the techniques of this disclosure are marked in italics below:

LSID (as defined in the draft ROUTE specification of ATSC 3.0)

Usage of the Content Descriptor in the LSID to signal the assignment of component properties to transport session in order to select the transport session for being handed to the media layer.

Usage of code point assignment

ROUTE/LCT Header Fields (see RFC 5651 and FIG. 9)

Congestion Control Information (CCI) 344: 32, 64, 96, or 128 bits. Used to carry congestion control information. For example, the congestion control information could include layer numbers, logical channel numbers, and sequence numbers. This field is opaque for the purpose of this specification, so it may be used in an arbitrary manner.

TSI: Transport Session Identifier (TSI) 346: 0, 16, 32, or 48 bits. The TSI uniquely identifies a session among all sessions from a particular sender. The TSI is scoped by the IP address of the sender, and thus the IP address of the sender and the TSI together uniquely identify the session. Although a TSI in conjunction with the IP address of the sender always uniquely identifies a session, whether or not the TSI is included in the LCT header depends on what is used as the TSI value. If the underlying transport is UDP, then the 16-bit UDP source port number MAY serve as the TSI for the session.

Transport Object Identifier (TOI) 348: 0, 16, 32, 48, 64, 80, 96, or 112 bits. This field indicates to which object within the session this packet pertains. For example, a sender might send a number of files in the same session, using TOI=0 for the first file, TOI=1 for the second one, etc. As another example, the TOI may be a unique global identifier of the object that is being transmitted from several senders concurrently, and the TOI value may be the output of a hash function applied to the object.

Code Point 342: 8 bits are available to signal different properties of the contained object as well as the relation to the current packet. An opaque identifier that is passed to the packet payload decode to convey information on the codec being used for the packet payload. The mapping between the code point and the actual codec is defined on a per session basis and communicated out-of-band as part of the session description information. The use of the CP field is similar to the Payload Type (PT) field in RTP headers as described in [RFC3550].

Specific Header Flags in the LCT header
  PSI 326: The usage of these bits, if any, is specific to each protocol instantiation that uses the LCT building block. If no protocol instantiation-specific usage of these bits is defined, then a sender MUST set them to zero and a receiver MUST ignore these bits.
  RES 334: owned by LCT, so not currently used ROUTE/LCT Extension Header (see RFC 5651 and FIG. 9).
  Header Extensions 350 may be used in LCT to accommodate optional header fields that are not always used or have variable size. Examples of the use of Header Extensions include:
    Extended-size versions of already existing header fields.
    Sender and receiver authentication information.
    Transmission of timing information.

Initialization Segment (Movie Header) of ISO BMFF (see ISO/IEC 14496-12)
  The metadata for a presentation is stored in the single Movie Box that occurs at the top-level of a file. The movie header allows to add additional information that is related to the media specific aspects of the component, e.g.:
    media header, overall information about the media handler, declares the media (handler) type
    media information container Outside ROUTE, LCT and ISO BMFF
  information on the physical layer (FIT)
  information in the presentation layer/application that runs the service.

Relevant functionalities of the MPD are summarized below, and how to address them in accordance with the techniques of this disclosure are discussed in greater detail below.

Availability Times and Presentation Time Anchoring: The availability time is signaled such that the availability time of the object or the MDE part of the object is signaled in the header. The presentation time anchoring is such that when the data is made available to the ISO BMFF client, the client starts decoding and performing playout immediately. The details of the timing are discussed below.

Type of Presentation—profile, static, dynamic, etc.: These parameters do not have to be set for broadcast, but the data may follow certain rules. A profile may be defined. The type is considered static. The detailed profile and media format definition are provided below.

Bandwidth and buffer descriptions: These parameters are not relevant for broadcast distribution, as the timing is determined by the arrival of the data. However, in order to initiate a short minimum buffer time, this aspect should be considered. This issue is discussed below.

Time shift buffer depth: This parameter is not relevant for broadcast, as the time shift buffer is determined by the reception information. However, it may be considered that there are some instructions from the sender on how long data should be stored in the client device (that is, the receiver device).

Splicing and reset information using Periods: For this, signalling may be necessary. A Period changes the initialization segment and resets the timeline. It is necessary that this information is conveyed and the playout of the Period start relative to the previous data is scheduled properly. Details on how this can be achieved are provided below.

Adaptation Set and Representation Metadata for selection/rejection: For ROUTE-based distribution, the selection of Adaptation Set and Representations needs to happen on LCT transport session level. Once a transport session is selected, this data is forwarded for decoding and processing to the ISO BMFF layer. The ISO BMFF layer, based on the information in the Initialization Segment may still select or reject or filter some data, but this is not relevant for the discussion here. For selecting the proper session, the information in the LSID is used. This issue is discussed in greater detail below.

Relationship of Representations (Switchable, dependency, etc.) and Seamless Switching Information: In most applications, only a single Representation per Adaptation Set is distributed in broadcast. However, should there be the case that multiple Representations are broadcast, then the individual aspects of each Representation may be provided in the LSID as described below. If seamless switching across the different Representations is required, this would then require the MPD, but only when performing Representation switching, and information required for seamless switching across the different Representations may also be signalled in the Initialization Segment. In certain cases, for example when using layered coding, this information is also provided in the Initialization Segment. Dependency of LSID sessions is signaled in the LSID, and additional details are described below.

Presentation Time Offset: The presentation time offset signals the first presentation time of the Representation in the Period, i.e., it provides an anchor. This information must be replicated by using information in ROUTE headers. This issue is discussed in greater detail below.

Location and URLs of Initialization and Media Segments: The MPD describes the location and binding of objects to MPD structures by addressing the following issues. It tells which object it is (Initialization Segment, Media Segment, other types) and puts it into context, for example, the sequence of media segments is described and provides the DASH client the information on how to use the data objects. The MPD points to URLs and by this a binding between the MPD information and the files, the media streaming is established. Further, the (E)FDT provides the mapping from TOI to URLs. This relationship and type indication must be replicated by the ROUTE delivery and for this purpose, the ROUTE header is used and strict usage of TSI, TOI and ROUTE headers is necessary in order to fulfill this purpose. Also certain sending orders may be taken into account. Another aspect that may be considered is how an IS relates to the Media Segments. The restrictions and details are discussed below.

Duration of Media Segments: Generally, the duration of media segments is used to compute the segment availability times and for the purpose of seeking. The duration is otherwise not relevant. So in general the information is not necessary for broadcast.

Detailed information on Content Protection: Content protection may be signaled in the Initialization Segment. If complex issues are to be signaled, the MPD may be considered necessary. But generally, the information in the Initialization Segment is considered sufficient.

Event Stream Signaling: Representations may carry an events stream that may have to be parsed by the DASH client. If Event Streams are considered relevant, they may be signaled in the LSID Content Descriptor. Alternatively, the MPD may be used to communicate Event Streams, but such event streams are not relevant for startup. Additional details on signaling inband event streams in the LSID are discussed below.

Auxiliary Data—Program Information, Metrics: The MPD may carry information that is relevant for certain operations, such as Program Information, Metrics collection initiation or other means. This information is not real-time critical and can be provided, if necessary at all, in an MPD that is delivered with slower frequency or that is provided over unicast.

The following aspects are considered for establishing a timing and buffer model:
  Every packet has a target transmission time (TTT) similar to what is defined in RFC 2250 for the RTP-based delivery of MPEG-2 TS. The target transmission time may either:
    be a sender hint information only, or
    be signaled in the congestion control header of the LCT packet as NTP timestamp (the middle 32 bits) or as 90 kHz clock similar to MPEG-2 TS or as any other clock with the timescale defined in the LSID, for example, the clock of the contained media.
  If present and known at the receiver, the TTT provides information on when exactly to release the data to the next layer, i.e., to the ISO BMFF layer.
  It is assumed that the ISO BMFF handler initiates decoding right away and renders the data instantaneously once it is released from the ROUTE level.
  Different ways are considered on how to signal the time to the receiver when it can deliver the data:
    An extension header in the first packet of the RAP group (the IS typically) and the first packet of the media segment signals how long the data needs to be hold back in the ROUTE receiver until it is released to the next level. This time is called the release time (RT). RT is in the same time scale as the TTT and may be compared to TTT time stamps (not the actual time). With increasing TTT the RT must not decrease. If the RT time in the extension header exceeds the largest TTT time of the current object/segment, then the data contained in this packet should be hold back until the TTT time is reached in the next segment or any future segment. Specifically the receiver may act as follows:
      If a packet is received with an RT time, then this data may be hold back until a packet is received with TTT that exceeds RT.
      If a packet is received without an RT time, then the contained object data may be released together with the preceding data, where "preceding" is the order of objects in increasing start_offset and increasing TOI numbers.
    If the TTT is in use and the receiver observes significant jitter between the TTT and the actual reception time, this jitter should be compensated in order to avoid buffer underflows.
      For example, a device may add some additional delay or transmit infrastructure adds some additional start up delay.
    Option 2: In this case absolute wall-clock time is used to schedule decoding. The object gets assigned a wall-clock time at which the object is to be moved out to the ISO BMFF engine. This case is mostly relevant when synchronized playout among different users is important. With increasing wall-clock time, the RT must increase. Specifically the receiver is expected to act as follows:
      If a packet is received with an RT time, then this data may be held back until the wall-clock time documented in RT is reached.
      If a packet is received without an RT time, then the contained object data may be released together with the preceding data where preceding is the order of objects that is in increasing start_offset and increasing TOI numbers.
    Option 3: A header bit in the ROUTE header is set to 10 in order to signal that the contained data cannot yet be released to the next level. Only if the bit is unset, set (i.e., equal to 1), the data can be delivered and pushed forward. If the last packet of the object (indicated by the B flag being set in the LCT header) still has the bit set to 10, then this can be released only when the object is complete. However, note that a complete object can always be delivered. Alternatively, this header bit is mandated to be equal to 1 for the last packet of each object.
  If the TTT is in use and the receiver observes significant jitter between the TTT and the actual reception time, this jitter should be compensated in order to avoid buffer underflows.
    For example, a device may add some additional delay or transmit infrastructure adds some additional start up delay.
Three different types of reception are considered:
1. MDE-based reception: In a first case the playout at the receiver is happening as quickly as possible based on prefixes of ISO BMFF files.
2. In a second case, only full segments must be released to the next level. The full segments are either requested by the DASH client or they are released according to the RT and TTT or wall-clock comparison. Typically, the ROUTE receiver makes the Segment available based on the RT information. The DASH client sends requests based on the MPD information. The content should be authored and delivered such that the segment availability start time is no earlier than the release time.

3. Wall-clock Anchoring: In a third case, the presentation of the data is held back for some time in order to enable synchronization with other media, for example, delivered outside the DASH system. The RAP must be released according to this data.

Nevertheless, the principle in all three cases stays the same; it may just be that the data units being released are either MDEs or full Segments.

Figure 10:
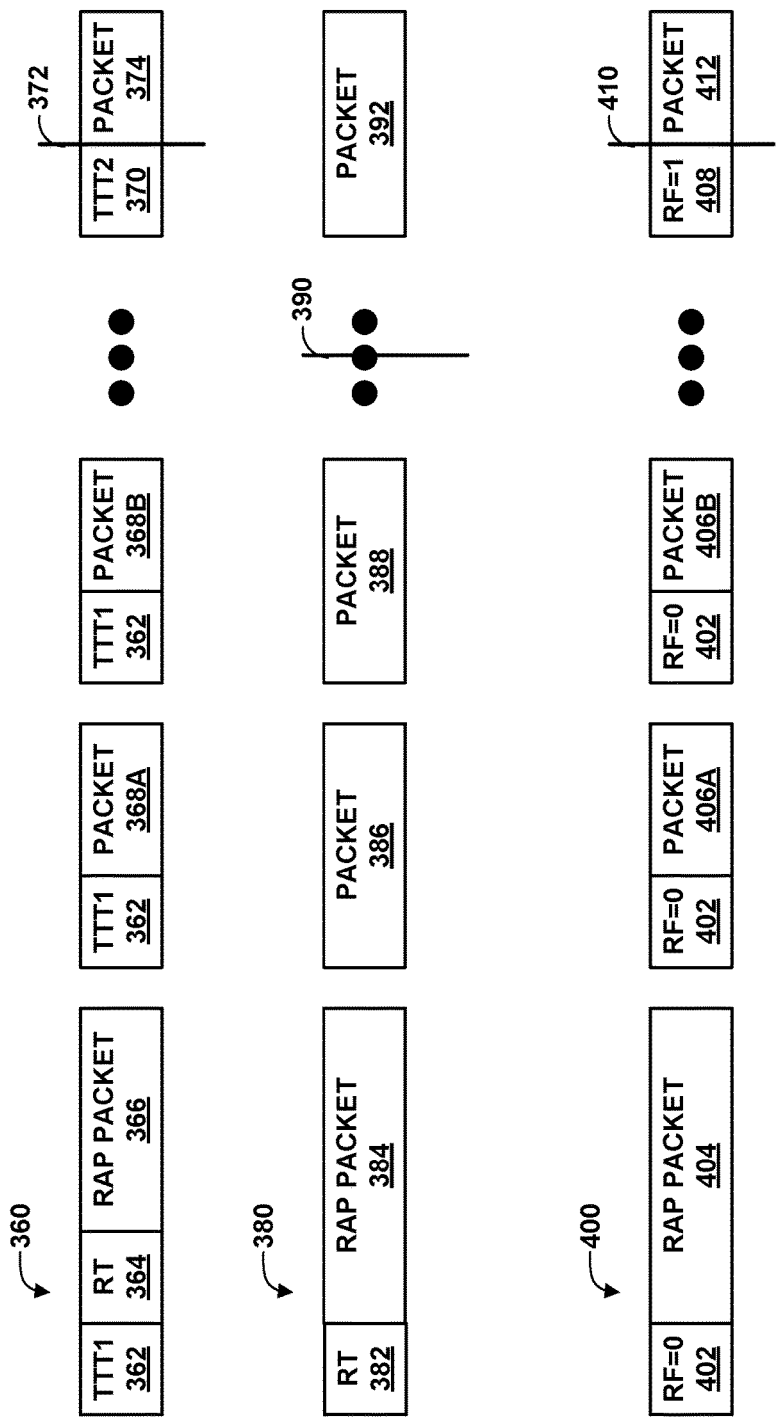
FIG. 10 is a conceptual diagram illustrating various options for signaling when a prefix of an object can be released to the next layer for decoding.

FIG. 10 is a conceptual diagram illustrating various options for signaling when a prefix of an object can be released to the next layer for decoding. The following example options, corresponding to some of the various options discussed in greater detail below, are briefly explained below and illustrated in FIG. 10:

1. First Example Option 360: For this example, FIG. 10 illustrates a series of packets including a RAP packet 366 and packets 368A, 368B, and 374. Each of these packets contains a respective Target Transmission Time (TTT) that basically matches the decode time on system level. In this example, each of RAP packet 366 and packets 368A, 368B contains TTT1 362, while packet 374 includes TTT2 370. The TTT information is used by the scheduler to schedule delivery. In addition, RAP packet 366 includes a release time (RT) 364 in the same domain as the TTT information, and RT 364 determines when the first packet of the group (the initialization segment (IS), typically), or any other packet, can be released to the next layer for immediate processing. The RT may be added once for an object or it may be added multiple times for an object. The RT may increase along with increasing sending time within one object to release objects in a more streaming like manner. In this example, RAP packet 366, packet 368A, and packet 368B are released when TTT1<RT 364<TTT2.

2. Second Example Option 380: For this example, FIG. 10 illustrates a series of packets including a RAP packet 384 and packets 386, 388, 392. RAP packet 384 is associated with RT 382. It is assumed that RAP packet 384 is received at time NTP1, packet 386 is received at NTP2, packet 388 is received at NTP3, and packet 392 is received at NTPX. In this case, only a release time in NTP is added for the object. This is similar to a segment availability time in the MPD, i.e., it is permitted to forward the object after this time. Thus, RAP packet 384 may be released at time 390 when NTP>=RT 382. The beneficial aspect is that this requires no additional timing signaling, but either the sender needs to take delivery delay and jitter into consideration in setting this release time in NTP, or the problem exists that any unexpected delay in the delivery causes issues as either the object cannot be presented timely (resulting in start-up delays) or the object is received delayed such that the timeline is missed. The option is beneficial for the purpose when using a wall-clock synchronization.

3. Third Example Option 400: For this example, FIG. 10 illustrates a series of packets including RAP packet 404 and packets 406A, 406B, 412. In this case, RAP packet 404 contains a release flag (RF) 402 (or "keeping flag") which includes information indicating after which time the data can be released to the next layer. In this example, RF=0 for RAP packet 404 and packets 406A, 406B. Thus, after NTP time 410, RAP packet 404 and packets 406A, 406B may be released, because the time at NTP time 410 is RF=1 408 (associated with packet 412). This approach is quite simple, but may encounter a problem as it might not allow signalling across segment boundaries. Nevertheless, Option 400 should still be taken into account, as it simplifies the operation of the ROUTE receiver.

Figure 11:
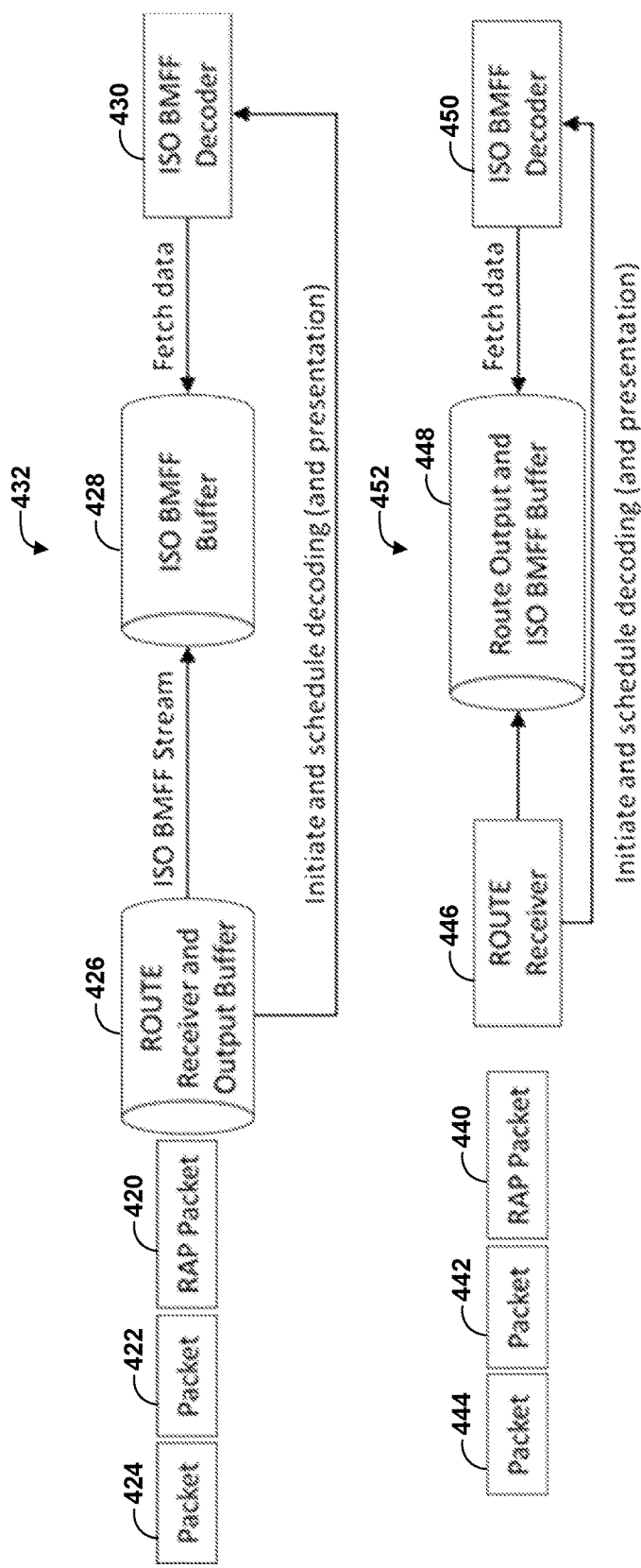
FIG. 11 is a conceptual diagram illustrating example models for data reception.

FIG. 11 is a conceptual diagram illustrating two example models for receiving and buffering received data. Retrieval unit 52 of client device 40 may include one or more components configured according to either of these examples. In the first example model 432, ROUTE receiver and output buffer 426 receives packets, such as RAP packet 420 and packets 422, 424. ROUTE receiver and output buffer initiates and schedules decoding and presentation with ISO BMFF decoder 430. ROUTE receiver and output buffer passes received data in the form of an ISO BMFF stream to ISO BMFF buffer 428. Based on the schedule established by ROUTE receiver and output buffer 426, ISO BMFF decoder 430 fetches data from ISO BMFF buffer 428, then decodes and presents the fetched data.

In the second example model 452, ROUTE receiver 446 receives packets, such as RAP packet 440 and packets 442, 444. ROUTE receiver buffers the received packets in ROUTE output and ISO BMFF buffer 448, and initiates and schedules decoding and presentation with ISO BMFF decoder 450. ISO BMFF decoder 450 fetches data from ROUTE output and ISO BMFF buffer 448, and decodes and presents the fetched data.

Based on the description above, the following aspects may be relevant:

The availability time is provided, e.g., according to one of the three options of FIG. 10 above, e.g., one of options 360, 380, or 400. This is the time when the first part of the segment is released to the ISO BMFF client.

The presentation time is such that decoding and rendering is initiated instantaneously at the receiver based on the provided information. Note that this is only a data model, and the buffer between the ROUTE receiver and the ISO BMFF receiver may be shared. Two example models (432, 452) are shown in FIG. 11. The RAP packet (e.g., RAP packet 420 or RAP packet 440 may contain information in the MDE that compensates the Period Start and the presentation time offset, i.e., the start of the earliest presentation in the Media Segment may be instantaneous.

Buffer verification and initial playout delays may be signaled by one of the three example options (360, 380, 400) above.

There are different cases that may be considered in the following in operational mode (example signaling of the different types is provided below). The different cases to be considered include:

Packets of regular Media Segments are just passed to the ISO BMFF buffer without any scheduling in the ROUTE receiver. The sender guarantees that the initial playout delay provides a seamless playout without buffer underrun. These packets may contain RTs as well for scheduling release, but typically this is not necessary as they may be released right away as the playout is scheduled by the ISO BMFF layer.

Redundant Initialization Segments are ignored by the receiver and are dropped and will not be passed to the ISO BMFF decoder.

Augmented Initialization Segments are provided to the ISO BMFF decoder. The decoder should however be informed that the media is time continuous, and that only some non-essential information changed. However, if no such API exists, then a reset may be done and the playout may be rescheduled.

Content Period Boundary: In this case, the IS must be forwarded and a complete new scheduling is enforced. Note that this may result in cases for which the ISO BMFF buffer with a few samples is flushed or no data is available for a small time which needs to be handled by the decoder. This is identical to regular DASH operations.

Note that the above operation may be possible because the sender must comply with the sending requirements discussed below in greater detail.

If the sender and receiver are configured to use segment-based delivery/reception, then information can be added to the timing signaling, as discussed below. However, in the case that segment-based reception is performed based on an MDE-based delivery, then the issue is trickier, because the receiver needs to understand how to make use of the timing information. The following options should be considered:

The MPD is made available in order to schedule and signal the segment availability times.

An attribute is added to the LSID for each component that indicates the additional delay in times of media time (and TTT) in order to support segment-based reception. Typically, such a time is the maximum segment duration. Note that the time is not in wall-clock time, but in transmission time, so if a burst based delivery is done, then the additional delay of segment delivery may be marginally more than the one of the MDE-based reception.

If the sender and receiver are configured to utilize wall-clock anchoring, that is, wall-clock based decoding, then information can be added to the timing signaling information discussed below. However, there may be cases for which MDE-based delivery is signaled, but the receiver needs to synchronize the decoding and playout to wall-clock time. The following options may be considered:

The MPD is made available in order to schedule and signal the segment availability times as well as the suggested presentation delay.

An attribute is added to the LSID for each component that indicates the mapping of the TTT or the decode time to the wall clock-time.

An extension header for LCT is created that provides this information, i.e., the mapping to wall-clock playout-scheduling.

In order to enable the selection of the media delivered in an LCT Transport Session based on the information in the LSID, many elements and attributes that are assigned to an Adaptation Set, except for the Representations, may be added to the LSID. Specifically, this may include any or all of the following information (for details refer to ISO/IEC 23009-1, clause 5.3.4 (Adaptation Set) and 5.3.7 (Common Attributes)):

An identifier using the @id element.
A group association using the @group attribute.
the language as described by the @lang attribute.
the media component type described by the @contentType attribute.
the picture aspect ratio as described by the @par attribute.
the role property as described by the Role elements.
the accessibility property as described by the Accessibility elements.
the viewpoint property as described by the Viewpoint elements.
the rating property as described by the Rating elements.

Information on segment properties (Random access, etc.): see SISSI core experiments.
@profiles attribute for the Adaptation Set.
@width and @height providing specifies the horizontal and vertical visual presentation size of the video media type on a grid determined by the @sar attribute.
@sar specifies the sample aspect ratio of the video media component type.
@framerate: specifies the output frame rate (or in the case of interlaced, half the output field rate) of the video media type.
@audiosamplingRate: maximum sampling rate of the audio media component type.
@mimeType: specifies the MIME type of the concatenation of the Initialization Segment, if present, and all consecutive Media Segments in the Representation.
@codecs: specifies the codecs present within the Representation. The codec parameters may also include the profile and level information where applicable.
@scanType: specifies the scan type of the source material of the video media component type.
FramePacking: specifies frame-packing arrangement information of the video media component type.
AudioChannelConfiguration: specifies the audio channel configuration of the audio media component type.
ContentProtection: specifies information about content protection schemes used for the associated Representations.
EssentialProperty: specifies information about the containing element that is considered essential by the Media Presentation author selecting this component.
SupplementalProperty: specifies supplemental information about the containing element that may be used for processing the component.
InbandEventStream: specifies the presence of an inband event stream in the associated Representations.

All of this information may be used for selection at the LCT Transport session level. If no selection is provided, all streams may be forwarded to the ISO BMFF handler for processing. This information may be provided for early filtering and selection on transport session level.

Figure 12:
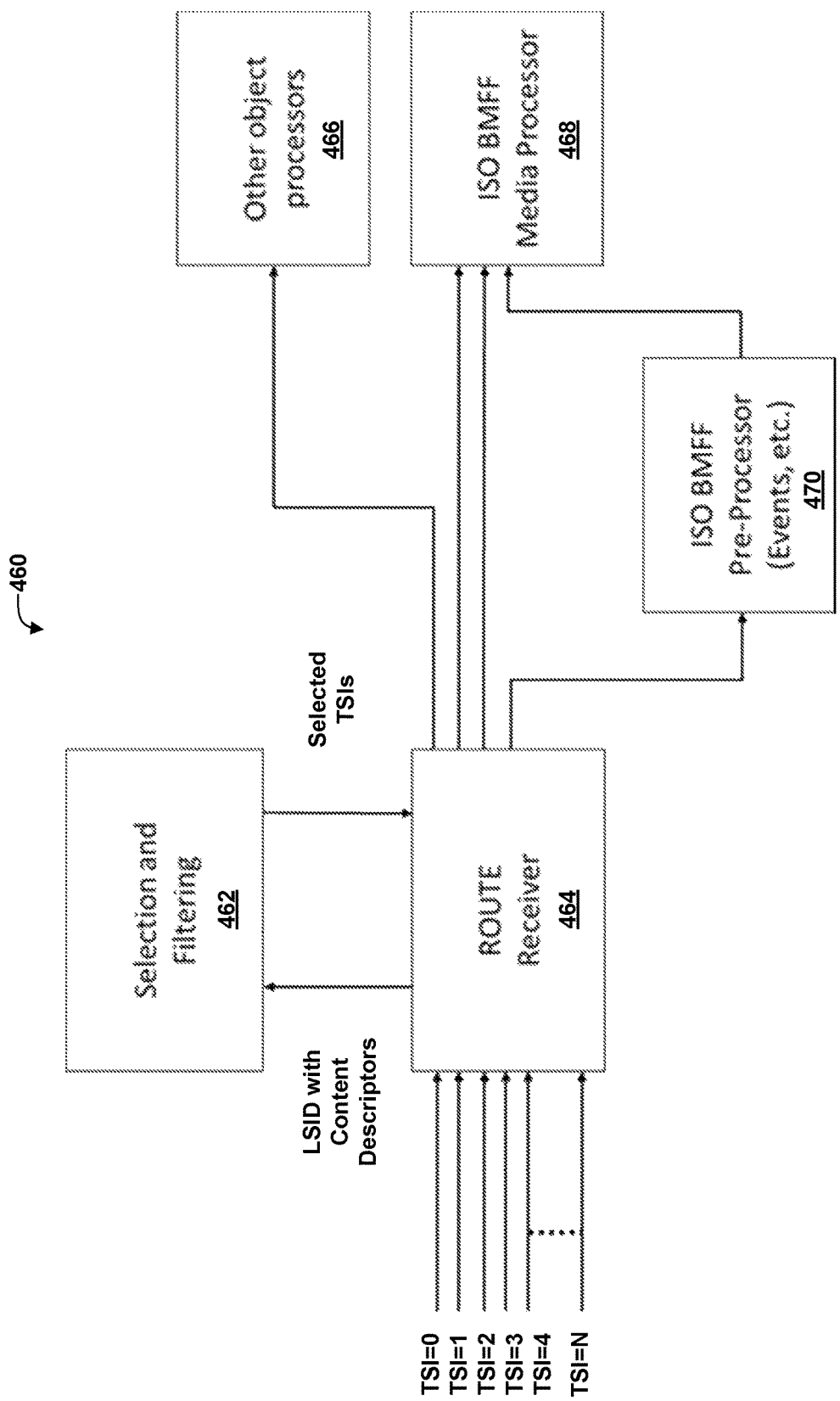
FIG. 12 is a conceptual diagram that illustrates an example system for receiving media data.

FIG. 12 is a conceptual diagram illustrating an example set of components of a receiver device 460, including a selection and filtering unit 462, a ROUTE receiver 464, other object processors 466, ISO BMFF media processor 468, and ISO BMFF pre-processor 470. Receiver device 460 may correspond to client device 40, where retrieval unit 52 may include selection and filtering unit 462 and ROUTE receiver 464, while decapsulation unit 54 may correspond to ISO BMFF pre-processor 470, ISO BMFF media processor 468, and other object processors 466.

In this example, ROUTE receiver 464 provides the LSID with content descriptors to selection and filtering unit 462. Based on the information, selection and filtering unit 462 may select the appropriate components that should be forwarded to the processors (e.g., ISO BMFF pre-processor 470, ISO BMFF media processor 468, and other object processor 466).

By applying the above principle, extensibility may be ensured with new schemes and extensions. The system maintains compatible with DASH-based deployments. In addition, ISO BMFF media processor 468 may also select or reject certain media streams on its level.

LCT Headers can be flexibly used in order to signal certain properties. However, the usage of the headers needs to be mandated for ROUTE. This is discussed below.

In an LSID that carries media flows (indicated by the Content Type xxx/mp4), Table 1 provides a setting of the code point field. This allows the sender and receiver to operate without the FDT and the MPD.

TABLE 1

Code Point Assignment for Media Flows with content type xxx/mp4

| Code Point | Semantics |
|---|---|
| 0 | Object Type described in FDT, unfragmented (whole packet contains IS, no ROUTE header) |
| 1 | Object Type described in FDT, 32 bit ROUTE header |
| 2 | New IS, timeline discontinuity, unfragmented (i.e., whole packet contains IS, no ROUTE header) |
| 3 | New IS, timeline changed, fragmented, 32 bit ROUTE header |
| 4 | New IS, timeline discontinuity, unfragmented (i.e., whole packet contains IS, no ROUTE header) |
| 5 | New IS, timeline continued, fragmented, 32 bit ROUTE header |
| 6 | Redundant IS, unfragmented (i.e., whole packet contains IS, no ROUTE header) |
| 7 | Redundant IS, fragmented, 32 bit ROUTE header |
| 8 | Media Segment unfragmented |
| 9 | Media Segment fragmented |
| 10 | Object in Entity Mode unfragmented |
| 11 | Object in Entity Mode fragmented |
| 12-127 | Reserved for static object association |
| 128-255 | Dynamic code point allocation through LSID |

The following LCT headers may be used in MPD-less ROUTE:
  The TSI signals a single ISO BMFF based Representation
  The TOI is used to signal the objects. The media segments within one content period must be sent with increasing TOI number, i.e., the objects are increased by 1. Only at content periods this may change. Media Segment TOIs may only use the space for which the first bit of the TOI is set to 1. Non-media segments may use the TOI space for which the first bit is set to 0.
  The code point is used as documented in section 3.6.2.
  The PSI bits are used as follows:
    If the first bit is set to 0, then time-based release signaling is applied:
      If the second bit is set to 0, then the congestion control field is unused.
      If the second bit is set to 1, then the congestion control field contains a time stamp in 90 kHz clock frequency.
    If the first bit is set to 1, then
      The second bit signals the release flag for the object.
  The congestion control field may be used to signal the time stamp in 90 kHz clock frequency.
  The following example LCT extension headers are defined:
    Initial release time in TTT: Specifies the earliest release time of the data contained in this packet in TTT time. An extension header of size 32 bit would be suitable.
    Initial release time in NTP: Specifies the exact release time of the current initial bytes of the object in NTP time. Again, 32 bits may be suitable, providing the middle 32 bits of an NTP timestamp.

It is assumed that the sending procedures from Option 1 are chosen below. The variants for options 2 and options 3 are for further study, and may be used in conjunction with the techniques described below or other techniques. The following sending behavior is considered without using the MPD for a certain media presentation:
  LSID Fragments may be provided by bootstrapping.
  LSID Fragments may be updated to signal any changes in the service offering.
  LSID Fragments describe all broadcast components of the service.
  A Content Descriptor may be added to describe the properties of each media component. The Content Descriptor should provide sufficient information such that the ROUTE receiver can select or reject certain components.
Generally, only a single Representation for each component (Adaptation Set) is distributed. However, if different Representations are distributed for the same Adaptation Set, then the LSID may contain sufficient information to differentiate the components, for example, by the quality ranking, the spatial resolution, the necessary codecs parameter, etc.
One LCT session (identified by a TSI) may be used for each Representation. The LCT sessions are multiplexed on packet level. The TTT should be used consistently across multiplexed LCT sessions.
Each packet may contain a target transmission time on a 90 kHZ basis. This time expresses the target delivery time. Preferably, the decode time of the contained media in the ISO BMFF is used.
The following sending procedure may be applied for Representations within a single LCT session:
  Any object may be sent in the LCT session. If the object is not a Media Segment, then the most significant bit in the TOI of may be 0. If the object is a Media Segment, then the most significant bit in the TOI may be 1. An object may either be identified by the static assignment in Table 1, or a code point may be defined in the LSID.
  Assume that a Media Segment has a specific release time. The IS corresponding to the media segment may signal the same release time. Note that the release time may only be sent in the IS if the Media Segment follows immediately.
  Initialization Segments are sent as objects using the ROUTE protocol. For IS only TOI number starting with a 0 in the most significant bit may be used.
    The type of the Initialization Segment is announced in Code Point according to Table 1.
    If the IS fits into a single ROUTE packet, then code point 2, 4, or 6 may be used. If the IS does not fit into a single ROUTE packet, then code point 3, 5 or 7 may be used.
    If the IS is first sent or the timeline is not continuous, then either code point 2 or 3 may be signaled. The IS must use a new TOI.
    The first packet of the IS may provide a random number for the TTT. However, in the latter case and in a continuous stream, the TTT should be continuing to express the playout schedule.
    If the IS is repeated to support random access, then either code point 6 or 7 may be signaled. The TOI may stay the same. The TTT may be continuous and not decreasing.
    If the IS is updated, but the timeline is continuous, then code point 4 or 5 is used. The IS must use a new TOI. The TTT may be continuous and not decreasing.
    Along with an IS, an extension header may be sent that indicates the earliest release time of the IS to the next layer in the same scale as the TTT. If not present, then the release time is immediate.

Media Segments (MSs) are sent as objects using the ROUTE protocol. For MS only TOI number starting with a 1 in the most significant bit may be used.

The type of the MS is announced in Code Point according to Table 1.

If the MS fits into a single ROUTE packet, then code point 8 may be used. If the MS does not fit into a single ROUTE packet, then code point 9 may be used.

Some additional rules may be necessary.

Figure 13:
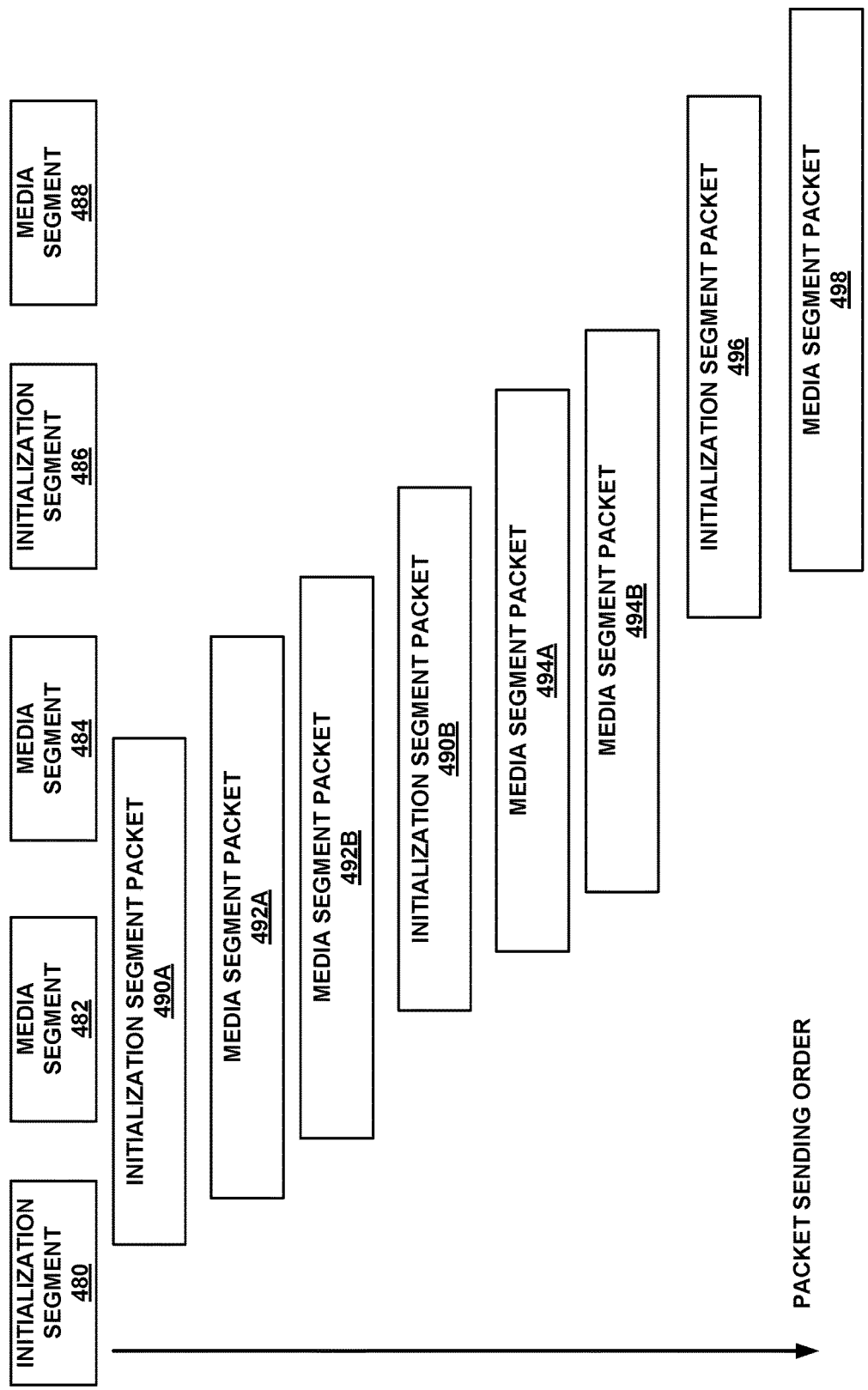
FIG. 13 is a conceptual diagram that illustrates an example sending procedure.

FIG. 13 is a conceptual diagram that illustrates an example sending procedure for an example series of packets. In this example, a first representation includes Initialization Segment 480 and two media segments 482, 484, which are to be sent followed by a second representation with new initialization segment 486 and a subsequent media segment 488. Each of the segments uses TSI=1. That is, this LCT session is used. The sending of the packets in order is shown in FIG. 13:

The first packet to be sent (initialization segment packet 490A) corresponds to initialization segment 480, with the TTT set to the decode time of the first sample in the MS being A. A TOI is selected for initialization segment packet 490A, and the CP is set to 2 to indicate a new timeline. The release time of initialization segment 480 is set to a value that is slightly larger than A to indicate when the presentation will start.

The second packet (media segment packet 492A) is the first packet of media segment 482, and media segment 482 is fragmented. Therefore, CP=9. A new TOI is used to indicate a new object. The same TTT is used as that used for initialization segment 480. As the data is to be released together with initialization segment 480, no new RT is sent.

For the second packet (media segment packet 492B) of media segment 482, a new transmission time is set (assuming that it contains a later decode time) with C>A. If B<C, then this would result in releasing initialization segment 480 and media segment packet 492A to the next layer.

In order to enable random access, initialization segment 480 will be sent redundantly (CP=4) with a TTT matching that of media segment packet 494A of media segment 484. A release time is set in the scale of the TTT.

Then, media segment 484 is sent in two packets (media segment packets 494A, 494B) in the same manner as media segment 482. The times are used for releasing the packets. A new TOI is used, that is one more than the TOI of media segment 482.

With a new Period starting, a new initialization segment 486 will be sent (in the form of initialization segment packet 496), which is therefore marked with CP=2. A new TOI is used for initialization segment 486. The TTT and the RT of the new Representation should be a continuation of the previous TTT in order to instruct playout sequence and timing.

Subsequently, media segment 488 may be sent as one or more packets, including media segment packet 498

In an alternative example, a lightweight MPD may be used. In this example, the timing and buffering signaling and operations are the same as above, while other changes above for signalling of non-timing MPD information through other means are not taken. Instead, the MPD is changed to enable it to contain only absolutely necessary information for the different scenarios (including for tuning in and channel change in broadcast) while other information is absent. To the extreme, when no MPD information is needed at all, it can be empty. When only a subset of the information is necessary and present, the MPD is lightweight, and hence, unnecessary overhead is avoided. The sender may choose to put regular MPD copies sparsely at some RAPs, and between two regular MPD copies, put a lightweight MPD at each RAP.

This may result in any or all of the following:

Startup MPDs that are simple, but redundant once the full MPD is received

The MPDs would only contain the information of the component

The timing would be ignored as it is driven by the lower layer.

No URLs for Segments are specified as those are delivered through the object protocol Basically, the Content Identifier mentioned above would be mapped into a separate object.

At this point in time, Segments conforming to the ISO BMFF Live Profile may be used. Optimizations for an improved media format for such applications are discussed in Stockhammer et al., "LOW LATENCY VIDEO STREAMING," U.S. Provisional Application 62/114,423, filed Feb. 10, 2015, the entire contents of which are hereby incorporated by reference.

For a hybrid service offering, the MPD may be important. A unified MPD that describes the broadcast and broadband distributed content may be used, whereby:

The MPD is either delivered as an object in the ROUTE session or the MPD is provided over broadband only through a link.

An EFDT is either delivered as an object in the ROUTE session or the EFDT is provided over broadband only through a link.

The EFDT documents the mapping between the TOI in the object delivery and the URL that can be seen in the MPD.

The timing is then controlled by the MPD, i.e. the broadcast segments are no longer pushed into the ISO BMFF client, but the DASH client controls the timing. However, the details are implementation specific.

Figure 14:
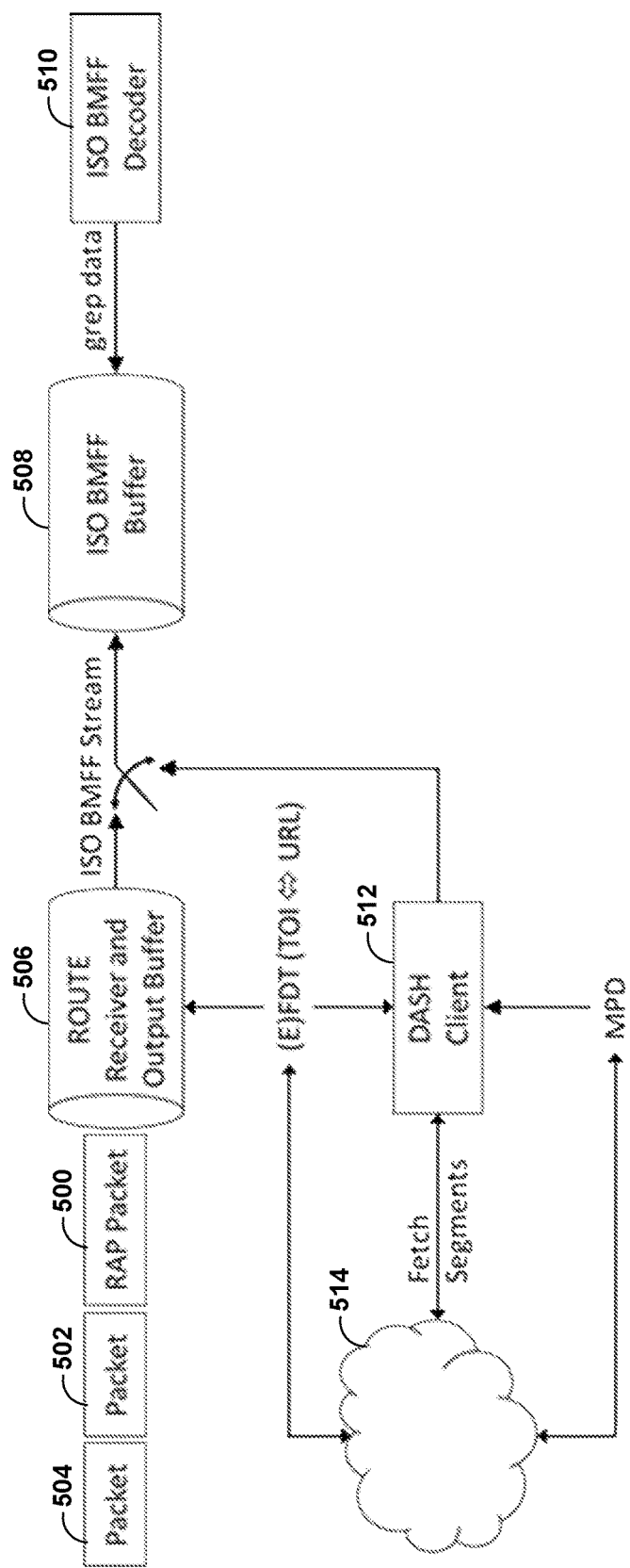
FIG. 14 is a conceptual diagram that illustrates an example hybrid DASH client model.

FIG. 14 is a conceptual diagram that illustrates an example hybrid DASH client model. Retrieval unit 52 of client device 40 of FIG. 1 may be configured according to the example of FIG. 14. In this example, the hybrid DASH client model includes ROUTE receiver and output buffer 506 and DASH client 512. According to the hybrid DASH client model, a client device may receive segments (e.g., RAP packet 500 and packets 502, 504) via ROUTE transmission using ROUTE receiver and output buffer 506 or via unicast transmission from network 514 using DASH client 512. Upon receiving segments, either ROUTE receiver and output buffer 506 provides the segments to ISO BMFF buffer 508 or DASH client 512 provides the segments to ISO BMFF buffer 508.

There are two example types of implementations for types of receptions for broadcast:

MPD-less Reception: ROUTE receiver and output buffer 506 directly forwards the data to ISO BMFF buffer 508 for decoding by ISO BMFF decoder 510 and playout.

MPD-based Reception: ROUTE receiver and output buffer 506 generates an MPD that includes all information, such that DASH client 512 retrieves the data from ROUTE receiver and output buffer 506 (e.g., acting as a proxy server) and stores the data to ISO BMFF buffer 508 for decoding and playout.

Both versions are possible, and are an implementation choice. In addition, a hybrid client may be implemented that uses broadcast and broadband in the manner as shown in FIG. 14. In this case, ROUTE receiver and output buffer 506 provides received data to ISO BMFF buffer 508 after receiving data from the broadcast stream. Once broadband is added, the relation is created by the MPD. DASH client 512 assigns URLs to TOIs and therefore can switch to broadband based on information in the MPD.

Figure 15:
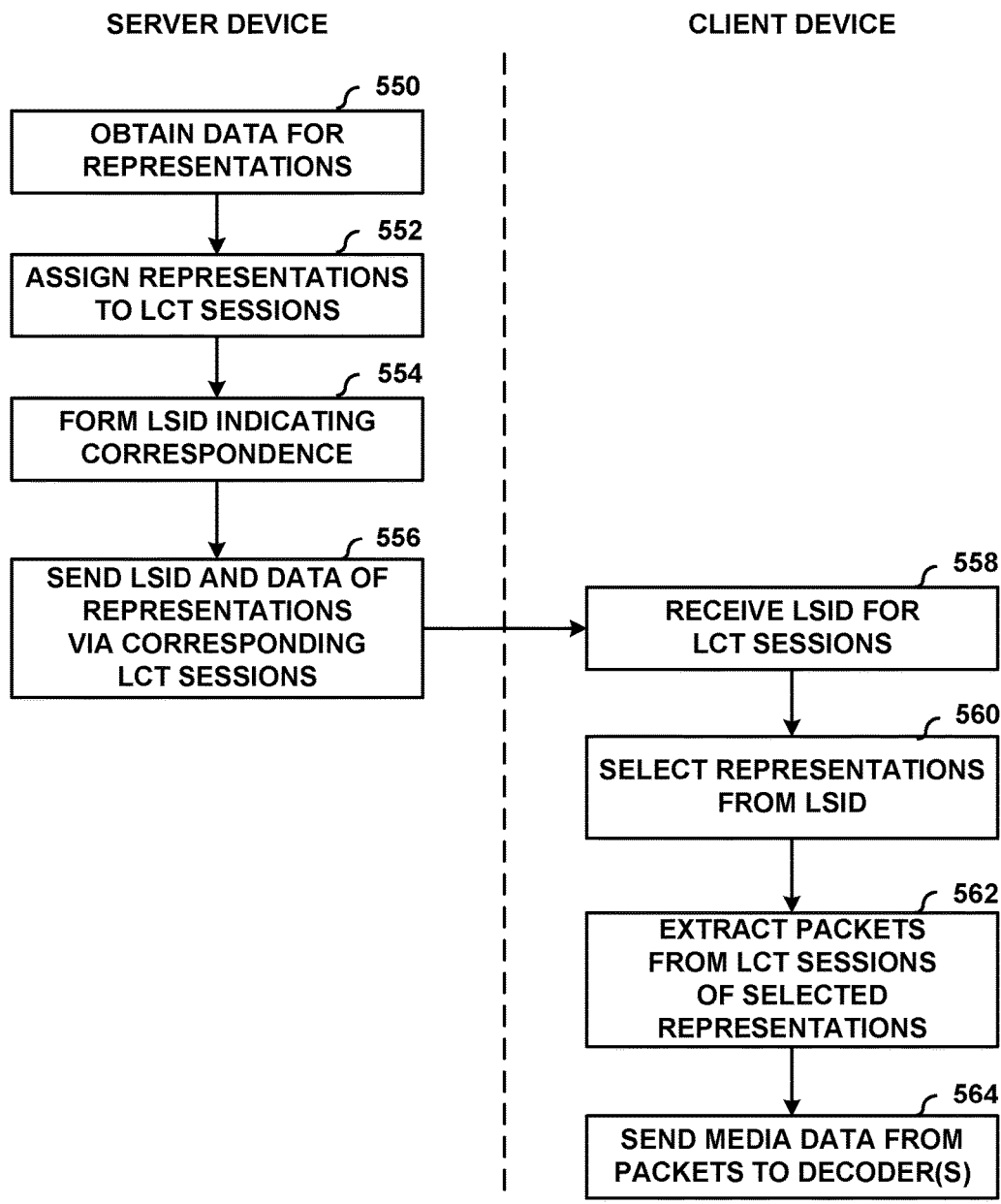
FIG. 15 is a flowchart illustrating an example method for transporting media data of a media presentation via LCT sessions in accordance with the techniques of this disclosure.

FIG. 15 is a flowchart illustrating an example method for transporting media data of a media presentation via LCT sessions in accordance with the techniques of this disclosure. The example of FIG. 15 is explained with respect to server device 60 and client device 40 of FIG. 1. However, it should be understood that other devices may be configured to perform these techniques. For example, devices of FIG. 4, 5, 6, 11, 12, or 14 may be configured to perform these techniques.

Initially, server device 60 may obtain data for a plurality of representations (550) of a media presentation. For example, server device 60 may receive prepared content from content presentation device 20 (FIG. 1). Alternatively, server device 60 may include media encoders (such as audio encoder 26 and video encoder 28) and/or an encapsulation unit (such as encapsulation unit 30) to prepare the representations for distribution. The plurality of representations may correspond to representations 68 of multimedia content 64 of FIG. 1. In addition, server device 60 may obtain a manifest file, such as an MPD, for the plurality of representations (e.g., manifest file 66 of FIG. 1).

Server device 60 may then assign the representations to LCT sessions (552). In general, each of the LCT sessions may carry data of one of the representations, such that there is a one-to-one relationship between LCT sessions and representations. Moreover, server device 60 may construct an LSID for the LCT sessions indicating a correspondence between the representations and the LCT sessions (554). The LSID may signal, for example, relationships between TSIs for the LCT sessions and representation identifiers (e.g., bandwidths for the representations). As noted above, server device 60 may also construct the LSID to describe IP and port combinations for the various LCT sessions.

Server device 60 may further construct the LSID to include data that would conventionally be included in the manifest file, such as, for example, attributes including any or all of @id, @group, @lang, @contentType, @par (picture aspect ratio), role elements, accessibility elements, viewpoint elements, rating elements, segment properties of segments of the representations, @profiles, @width and @height, @sar, @framerate, @audiosamplingRate, @mimeType, @codecs, @scanType, FramePacking, AudioChannelConfiguration, ContentProtection, EssentialProperty, SupplementalProperty, and/or InbandEventStream, as discussed above.

Moreover, server device 60 may construct packets of the LCT sessions to include an LCT header in accordance with, e.g., the example of FIG. 9. The packets may include data of segments of the representations. The header information may indicate, for example, TSIs and/or TOIs of corresponding representations and segments.

Server device 60 may then send the LSID and data of the representations via corresponding LCT sessions (556). Client device 40 may receive the LSID for the LCT sessions (558). Although not shown in the example of FIG. 15, server device 60 may also send the manifest file periodically, e.g., with certain random access points of the representations. In particular, in this example, it is assumed that client device 40 receives the LSID before receiving the manifest file (e.g., between manifest files). However, in accordance with the techniques of this disclosure, client device 40 may access media data of one or more of the LCT sessions (and, therefore, the corresponding representations) using the LSID, without (or prior to) receiving the manifest file.

For example, client device 40 may determine the correspondences between LCT sessions and representations. Client device 40 may also determine characteristics of the representations using data signaled in the LSID. For example, client device 40 may determine which of the representations matches coding and rendering characteristics supported by elements of client device 40, such as audio decoder 46, video decoder 48, audio output 42, and video output 44. Based on the supported characteristics and coding and rendering characteristics of the representations, client device 40 may select the representations using the LSID (560). For example, client device 40 may select those representations having coding and rendering characteristics supported by the elements of client device 40.

Client device 40 may further extract packets from the LCT sessions of the selected representations (562). Each packet may correspond to a segment of the representation. Each segment of the representation may be transmitted in the form of one or more packets. As discussed above with respect to the various examples of FIG. 10, the packets may include information indicating when the packets can be released. Thus, after all packets for a segment have been received, retrieval unit 52 of client device 40 may send a reconstructed segment to decapsulation unit 50, which may ultimately decapsulate media data and send the media data to appropriate decoders, e.g., audio decoder 46 or video decoder 48. In this manner, client device 40 may send media data from the packets to appropriate decoders (564) for decoding, and ultimately, presentation.

In this manner, the example method of FIG. 15 represents an example of a method including determining a plurality of representations of a Dynamic Adaptive Streaming over HTTP (DASH) media presentation from a layered coding transport (LCT) Session Instance Description (LSID), wherein the LSID includes information representative of a plurality of LCT sessions, each of the LCT sessions including data of a respective one of the representations, and initiating consumption of one or more of the representations of the DASH media presentation using the LSID and without using a manifest file for the DASH media presentation, wherein the initiating consumption comprises receiving packets of the LCT sessions including portions of data of the one or more of the representations, and providing data of the packets to a media decoder.

The example method of FIG. 15 also represents an example of a method including constructing a layered coding transport (LCT) Session Instance Description (LSID) including information representative of a plurality of LCT sessions, each of the LCT sessions including data of a respective one of a plurality of representations of a Dynamic Adaptive Streaming over HTTP (DASH) media presentation, wherein the LSID indicates correspondences between the LCT sessions and the representations, outputting the LSID, and outputting data of the representations in the corresponding LCT sessions.

Figure 16:
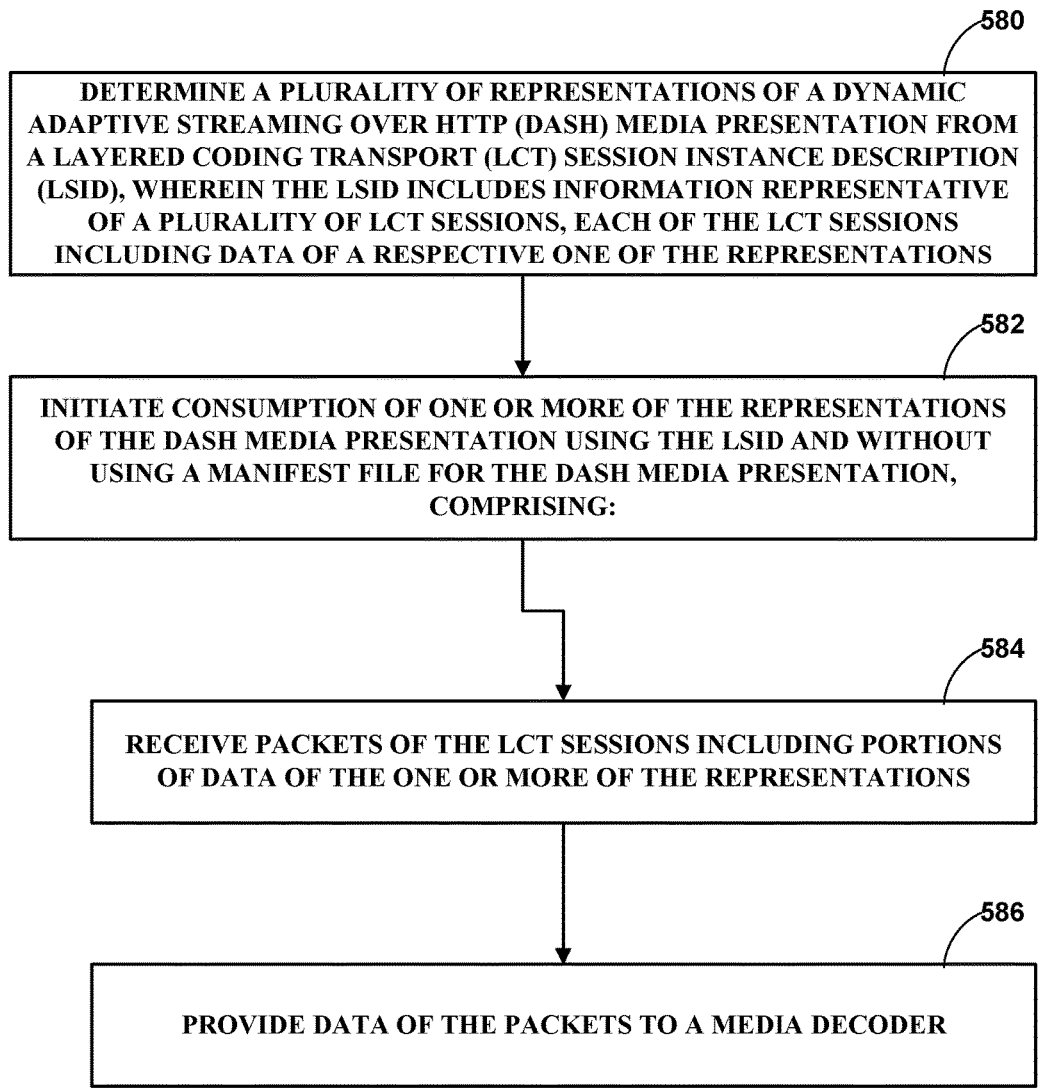
FIG. 16 is a flowchart illustrating another example method for transporting media data of a media presentation via LCT sessions in accordance with the techniques of this disclosure.

FIG. 16 is a flowchart illustrating another example method for transporting media data of a media presentation via LCT sessions in accordance with the techniques of this disclosure. In this example, client device 40 initially determines a plurality of representations of a Dynamic Adaptive Streaming over HTTP (DASH) media presentation from a layered coding transport (LCT) Session Instance Description (LSID), wherein the LSID includes information representative of a plurality of LCT sessions, each of the LCT sessions including data of a respective one of the representations (580). Client device 40 then initiates consumption of one or more of the representations of the DASH media presentation using the LSID and without using a manifest file for the DASH media presentation (582). In particular, when initiating consumption, client device 40 receives packets of the LCT sessions including portions of data of the one or more of the representations (584), and provides data of the packets to a media decoder (586).

Figure 17:
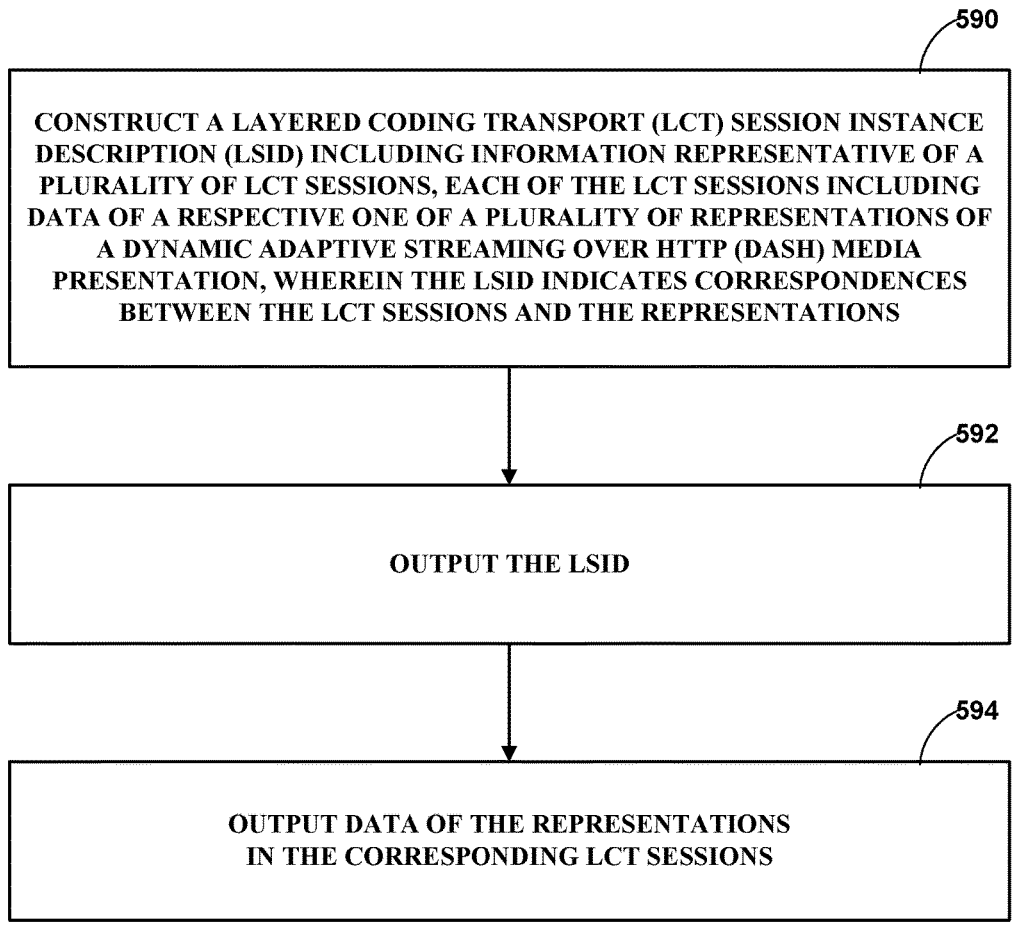
FIG. 17 is a flowchart illustrating another example method for transporting media data of a media presentation via LCT sessions in accordance with the techniques of this disclosure.

FIG. 17 is a flowchart illustrating another example method for transporting media data of a media presentation via LCT sessions in accordance with the techniques of this disclosure. In this example, server device 60 constructs a layered coding transport (LCT) Session Instance Description (LSID) including information representative of a plurality of LCT sessions, each of the LCT sessions including data of a respective one of a plurality of representations of a Dynamic Adaptive Streaming over HTTP (DASH) media presentation, wherein the LSID indicates correspondences between the LCT sessions and the representations (590). Server device 60 then outputs the LSID (592) and outputs data of the representations in the corresponding LCT sessions (594).

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of receiving media data, the method comprising:
   determining a plurality of representations of a Dynamic Adaptive Streaming over HTTP (DASH) media presentation from a layered coding transport (LCT) Session Instance Description (LSID), wherein the LSID includes information representative of a plurality of LCT sessions, each of the LCT sessions including data of a respective one of the representations;
   initiating consumption of one or more of the representations of the DASH media presentation based on: 1) using the LSID and 2) without using a manifest file to generate a request for a portion of data of the one or more representations of the DASH media presentation, wherein the initiating consumption comprises:
     receiving a first set of data including packets of the LCT sessions including the portion of the data of the one or more of the representations up to a first playback time; and
     providing data of the packets to a media decoder;
   after receiving the first set of data, receiving the manifest file; and
   receiving a second set of data, different from the first set of data, of the DASH media presentation using the manifest file, the second set of data having playback times following the first playback time.

2. The method of claim 1, further comprising:
   determining at least one of coding characteristics or rendering characteristics of the representations of the DASH media presentation from one or more content descriptors of the LSID; and
   selecting the one or more of the representations based on the determined coding characteristics or rendering characteristics.

3. The method of claim 2, wherein the one or more coding characteristics or rendering characteristics include one or more of codec, accessibility information, quality, spatial resolution, viewpoint, rating, a profile attribute of an adaptation set, sample aspect ratio, frame rate, audio sampling rate, mime type, scan type, frame packing information, audio channel configuration, content preparation, essential property, supplemental property, or inband event stream.

4. The method of claim 1, further comprising using the manifest file to combine broadcast and unicast delivery of data of the DASH media presentation.

5. The method of claim 1, wherein the DASH media presentation provides a first plurality of lightweight manifest files with a first set of random access points (RAPs) of the DASH media presentation, and a second plurality of full manifest files with a second plurality of RAPs, wherein the second plurality of RAPs is smaller than the first plurality of RAPs.

6. The method of claim 1, further comprising receiving data indicative of target transmission times in the packets of the LCT sessions.

7. The method of claim 6, wherein receiving the data indicative of the target transmission times comprises receiving the data indicative of the target transmission times in congestion control information fields of LCT headers of the packets or header extension fields of the LCT headers.

8. The method of claim 6, wherein the target transmission times are expressed as one of relative times to other packets of the LCT sessions or absolute wall clock times.

9. The method of claim 6, wherein the target transmission times are expressed relative to target transmission times of other packets of the LCT sessions, the method further comprising receiving data indicating release times signaled in at least some of the packets.

10. The method of claim 1, wherein at least one of the one or more representations includes an initialization segment and one or more media segments formatted according to a DASH segment format, and wherein packets comprising data for the initialization segment or the media segments further comprise LCT headers.

11. The method of claim 10, further comprising, for each of the packets, determining, from a codepoint field of the LCT header of the packet: a type for a segment to which the packet corresponds, whether the packet includes a ROUTE header, whether timeline discontinuities can be signaled for the packet, whether the packet corresponds to a redundant initialization segment, and whether the packet corresponds to an auxiliary initialization segment.

12. The method of claim 1, further comprising using transport session identifier (TSI) fields of LCT headers of the packets of the LCT sessions description to determine correspondences between the LCT sessions and the representations.

13. The method of claim 1, further comprising determining release times for data of packets of the LCT sessions from at least one of protocol-specific indication (PSI) bits of LCT headers of the packets or extension headers of the LCT headers of the packets.

14. The method of claim 1, further comprising determining target transmission times for packets of the LCT sessions from congestion control information of LCT headers of the packets.

15. The method of claim 1, further comprising determining sequence numbers for media segments of the DASH media presentation from transport object identifiers (TOIs) signaled in LCT headers of packets of the LCT sessions.

16. A device for receiving media data, the device comprising:
one or more media decoders configured to decode media data;
a network interface configured to receive a layered coding transport (LCT) Session Instance Description (LSID), wherein the LSID includes information representative of a plurality of LCT sessions, each of the LCT sessions including data of a respective one of a plurality of representations of a Dynamic Adaptive Streaming over HTTP (DASH) media presentation and data of one or more of the LCT sessions; and
a processor configured to:
initiate consumption of one or more of the representations of the DASH media presentation based on: 1) use of the LSID and 2) without use of a manifest file to generate a request for a portion of data of the one or more representations of the DASH media presentation, wherein to initiate consumption, the processor is configured to:
receive, via the network interface, a first set of data including packets of the LCT sessions including the portion of the data of the one or more of the representations up to a first playback time; and
provide data of the packets to the one or more media decoders;
after receiving the first set of data, receive the manifest file; and
receive a second set of data, different from the first set of data, of the DASH media presentation using the manifest file, the second set of data having playback times following the first playback time.

17. The device of claim 11, wherein the processor is further configured to:
determine at least one of coding characteristics or rendering characteristics of the representations of the DASH media presentation from one or more content descriptors of the LSID; and
select the one or more of the representations based on the determined coding characteristics or rendering characteristics.

18. The device of claim 11, wherein the processor is further configured to determine target transmission times from the packets of the LCT sessions and to use the target transmission times to provide the data of the packets to the one or more media decoders.

19. The device of claim 11, wherein at least one of the one or more representations includes an initialization segment and one or more media segments formatted according to a DASH segment format, and wherein the packets comprising data for the initialization segment or the media segments further comprise LCT headers.

20. The device of claim 19, wherein the processor is further configured to, for each of the packets, determine, from a codepoint field of the LCT header of the packet: a type for a segment to which the packet corresponds, whether the packet includes a ROUTE header, whether timeline discontinuities can be signaled for the packet, whether the packet corresponds to a redundant initialization segment, and whether the packet corresponds to an auxiliary initialization segment.

21. The device of claim 11, wherein the processor is configured to determine correspondences between the LCT sessions and the representations from transport session identifier (TSI) fields of LCT headers of the packets of the LCT sessions.

22. The device of claim 11, wherein the processor is configured to determine release times for data of packets of the LCT sessions from at least one of protocol-specific indication (PSI) bits of LCT headers of the packets or extension headers of the LCT headers of the packets.

23. The device of claim 11, wherein the processor is configured to determine sequence numbers for media segments of the DASH media presentation from transport object identifiers (TOIs) signaled in LCT headers of packets of the LCT sessions.

24. The device of claim 11, wherein the device comprises at least one of:
    an integrated circuit;
    a microprocessor; or
    a wireless communication device.

25. A device for receiving media data, the device comprising:
    means for determining a plurality of representations of a Dynamic Adaptive Streaming over HTTP (DASH) media presentation from a layered coding transport (LCT) Session Instance Description (LSID), wherein the LSID includes information representative of a plurality of LCT sessions, each of the LCT sessions including data of a respective one of the representations;
    means for initiating consumption of one or more of the representations of the DASH media presentation based on 1) use of the LSID and 2) without use of a manifest file to generate a request for a portion of data of the one or more representations of the DASH media presentation, wherein the means for initiating consumption comprises:
        means for receiving a first set of data including packets of the LCT sessions including the portion of the data of the one or more of the representations up to a first playback time; and
        means for providing data of the packets to a media decoder;
    means for receiving the manifest file after receiving the first set of data; and
    means for receiving a second set of data, different from the first set of data, of the DASH media presentation using the manifest file, the second set of data having playback times following the first playback time.

26. A computer-readable storage medium having stored thereon instructions that, when executed, cause a processor of a device for receiving media data to:
    determine a plurality of representations of a Dynamic Adaptive Streaming over HTTP (DASH) media presentation from a layered coding transport (LCT) Session Instance Description (LSID), wherein the LSID includes information representative of a plurality of LCT sessions, each of the LCT sessions including data of a respective one of the representations;
    initiate consumption of one or more of the representations of the DASH media presentation based on: 1 use of the LSID and 2) without use of a manifest file to generate a request for a portion of data of the one or more representations of the DASH media presentation, wherein the instructions that cause the processor to initiate consumption comprise instructions that cause the processor to:
        receive a first set of data including packets of the LCT sessions including the portion of the data of the one or more of the representations up to a first playback time; and
        provide data of the packets to a media decoder;
    after receiving the first set of data, receive the manifest file; and
    receive a second set of data, different from the first set of data, of the DASH media presentation using the manifest file, the second set of data having playback times following the first playback time.

27. A method of sending media data, the method comprising:
    constructing a layered coding transport (LCT) Session Instance Description (LSID) including information representative of a plurality of LCT sessions, each of the LCT sessions including data of a respective one of a plurality of representations of a Dynamic Adaptive Streaming over HTTP (DASH) media presentation, wherein the LSID indicates correspondences between the LCT sessions and the representations;
    outputting the LSID;
    outputting, without reception of a request for data of the representations that is based on a manifest file, a first set of data including the data of the representations in the corresponding LCT sessions up to a first playback time;
    after outputting the first set of data, outputting the manifest file; and
    outputting a second set of data, different from the first set of data, of the DASH media presentation in response to one or more requests based on the manifest file, the second set of data having playback times following the first playback time.

28. A device for sending media data, the device comprising:
    a network interface for outputting data of a plurality of layered coding transport (LCT) sessions; and
    a processor configured to:
        construct an LCT Session Instance Description (LSID) including information representative of a plurality of LCT sessions, each of the LCT sessions including data of a respective one of a plurality of representations of a Dynamic Adaptive Streaming over HTTP (DASH) media presentation, wherein the LSID indicates correspondences between the LCT sessions and the representations;
        output the LSID via the network interface;
        output, without reception of a request for data of the representations that is based on a manifest file, a first set of data including the data of the representations in the corresponding LCT sessions via the network interface up to a first playback time;
        after outputting the first set of data, output the manifest file; and
        output a second set of data, different from the first set of data, of the DASH media presentation in response to one or more requests based on the manifest file, the second set of data having playback times following the first playback time.

29. A device for sending media data, the device comprising:
    means for constructing a layered coding transport (LCT) Session Instance Description (LSID) including information representative of a plurality of LCT sessions, each of the LCT sessions including data of a respective one of a plurality of representations of a Dynamic Adaptive Streaming over HTTP (DASH) media presentation, wherein the LSID indicates correspondences between the LCT sessions and the representations;
    means for outputting the LSID;

means for outputting, without reception of a request for data of the representations that is based on a manifest file, a first set of data including the data of the representations in the corresponding LCT sessions up to a first playback time;

means for outputting the manifest file after outputting the first set of data; and means for outputting a second set of data, different from the first set of data, of the DASH media presentation in response to one or more requests based on the manifest file, the second set of data having playback times following the first playback time.

30. A computer-readable storage medium having stored thereon instructions that, when executed, cause a processor of a device for sending media data to:

construct a layered coding transport (LCT) Session Instance Description (LSID) including information representative of a plurality of LCT sessions, each of the LCT sessions including data of a respective one of a plurality of representations of a Dynamic Adaptive Streaming over HTTP (DASH) media presentation, wherein the LSID indicates correspondences between the LCT sessions and the representations;

output the LSID;

output, without reception of a request for data of the representations that is based on a manifest file, the data of the representations in the corresponding LCT sessions;

after outputting the first set of data, output the manifest file; and output a second set of data, different from the first set of data, of the DASH media presentation in response to one or more requests based on the manifest file, the second set of data having playback times following the first playback time.

\* \* \* \* \*